United States Patent
Kilar et al.

(10) Patent No.: US 11,386,931 B2
(45) Date of Patent: Jul. 12, 2022

(54) METHODS AND SYSTEMS FOR ALTERING VIDEO CLIP OBJECTS

(71) Applicant: VERIZON PATENT AND LICENSING INC., Basking Ridge, NJ (US)

(72) Inventors: Jason A. Kilar, Hillsborough, CA (US); Richard W. Tom, San Francisco, CA (US); Lonn Lee, Belmont, CA (US); Bao Lei, San Bruno, CA (US); Zachary Pinter, San Francisco, CA (US); Lindsay Monroe, San Francisco, CA (US); Yilli Aiwazian, San Francisco, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 128 days.

(21) Appl. No.: 15/618,280

(22) Filed: Jun. 9, 2017

(65) Prior Publication Data
US 2017/0358321 A1    Dec. 14, 2017

Related U.S. Application Data

(60) Provisional application No. 62/348,706, filed on Jun. 10, 2016.

(51) Int. Cl.
| | |
|---|---|
| *G06F 3/048* | (2013.01) |
| *G11B 27/00* | (2006.01) |
| *G11B 27/028* | (2006.01) |
| *G11B 27/031* | (2006.01) |
| *H04N 21/414* | (2011.01) |
| *H04N 21/4223* | (2011.01) |
| *H04N 21/4788* | (2011.01) |
| *H04N 21/475* | (2011.01) |
| *G10L 21/003* | (2013.01) |
| *G11B 27/036* | (2006.01) |

(Continued)

(52) U.S. Cl.
CPC .......... *G11B 27/002* (2013.01); *G11B 27/028* (2013.01); *G11B 27/031* (2013.01); *H04N 21/41407* (2013.01); *H04N 21/4223* (2013.01); *H04N 21/4758* (2013.01); *H04N 21/4788* (2013.01); *G10L 21/003* (2013.01); *G10L 21/0356* (2013.01); *G10L 2015/088* (2013.01); *G11B 27/036* (2013.01)

(58) Field of Classification Search
CPC . G06F 3/0481; G06F 3/04842; G11B 27/002; G11B 27/028; G11B 27/031; G11B 27/036; H04N 21/41407; H04N 21/4223; H04N 21/4758; H04N 21/4788; G10L 21/003; G10L 21/0356; G10L 2015/088
See application file for complete search history.

(56) References Cited

U.S. PATENT DOCUMENTS 8,620,146 B1 *  12/2013  Coleman ................ H04N 5/772
                                                        386/278
8,917,355 B1 *  12/2014  Mo ..................... H04N 21/4394
                                                        348/38

(Continued)

*Primary Examiner* — Haoshian Shih

(57) ABSTRACT

The present disclosure relates generally to content delivery techniques in audio-visual streaming systems. The techniques include altering video or audio portions of media content based on user input or interaction. The techniques further include altering text or messaging distributed to multiple users based on user input.

19 Claims, 25 Drawing Sheets

(51) Int. Cl.
*G10L 15/08* (2006.01)
*G10L 21/0356* (2013.01)

(56) References Cited

U.S. PATENT DOCUMENTS

| | | | | |
|---|---|---|---|---|
| 9,246,856 B1* | 1/2016 | Pan | H04N 21/2668 | |
| 9,685,190 B1* | 6/2017 | Fishkin | G11B 20/10527 | |
| 10,319,410 B1* | 6/2019 | Townsend | G11B 27/30 | |
| 2007/0028274 A1* | 2/2007 | Walker | H04N 7/24 | |
| | | | 725/90 | |
| 2009/0150920 A1* | 6/2009 | Jones | G06Q 30/02 | |
| | | | 725/23 | |
| 2010/0231791 A1* | 9/2010 | Prestenback | H04N 5/76 | |
| | | | 348/565 | |
| 2011/0052155 A1* | 3/2011 | Desmarais | H04N 5/76 | |
| | | | 386/290 | |
| 2013/0226578 A1* | 8/2013 | Bolton | H04N 21/4758 | |
| | | | 704/235 | |
| 2013/0235215 A1* | 9/2013 | Okada | H04N 5/77 | |
| | | | 348/207.1 | |
| 2014/0133836 A1* | 5/2014 | Burns | G11B 27/10 | |
| | | | 386/278 | |
| 2014/0152760 A1* | 6/2014 | Granstrom | H04N 21/2541 | |
| | | | 348/14.08 | |
| 2014/0187315 A1* | 7/2014 | Perry | A63F 13/12 | |
| | | | 463/29 | |
| 2014/0368734 A1* | 12/2014 | Hoffert | H04L 65/60 | |
| | | | 348/564 | |
| 2015/0071612 A1* | 3/2015 | Ru | G11B 27/06 | |
| | | | 386/278 | |
| 2015/0339396 A1* | 11/2015 | Ayers | G06F 16/9535 | |
| | | | 707/734 | |
| 2015/0347579 A1* | 12/2015 | Hua | G06F 16/78 | |
| | | | 707/737 | |
| 2015/0380052 A1* | 12/2015 | Hamer | H04N 21/21805 | |
| | | | 386/241 | |
| 2016/0005440 A1* | 1/2016 | Gower | H04N 21/4756 | |
| | | | 386/241 | |
| 2017/0134714 A1* | 5/2017 | Soni | H04N 5/23238 | |
| 2017/0149854 A1* | 5/2017 | Dove | G06F 3/14 | |
| 2017/0180772 A1* | 6/2017 | Wilms | H04N 21/2668 | |
| 2017/0199659 A1* | 7/2017 | Migos | G06F 40/106 | |
| 2017/0208362 A1* | 7/2017 | Flores | H04L 65/60 | |
| 2017/0244984 A1* | 8/2017 | Aggarwal | H04N 21/23805 | |
| 2018/0137835 A1* | 5/2018 | Jain | G09G 5/14 | |

* cited by examiner

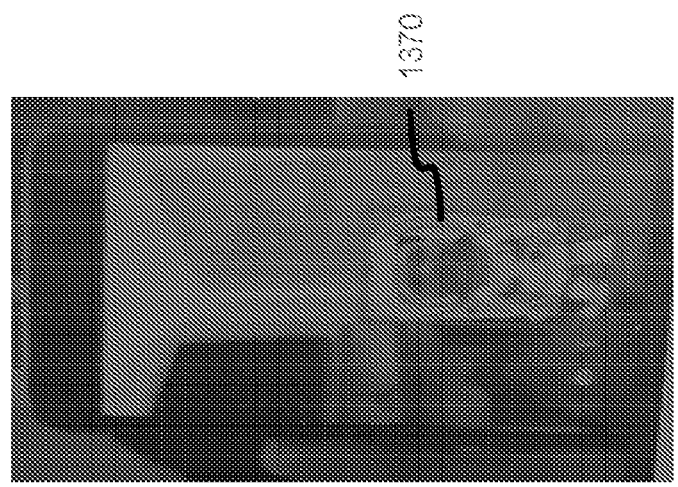
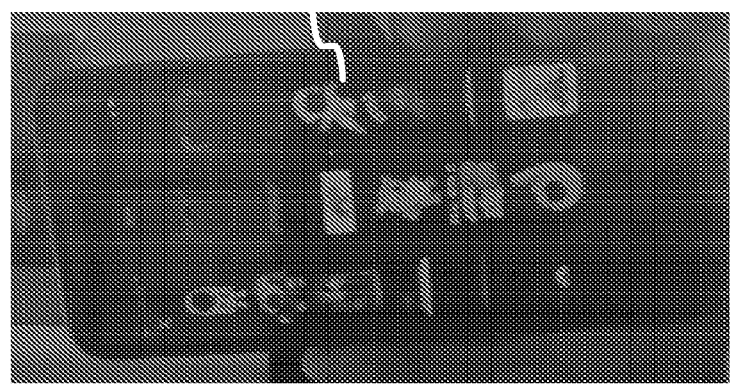
FIG. 13C
FIG. 13B
FIG. 13A

METHODS AND SYSTEMS FOR ALTERING VIDEO CLIP OBJECTS

CROSS-REFERENCES TO RELATED APPLICATIONS

This application claims priority to U.S. Provisional Patent Application No. 62/348,706, filed on Jun. 10, 2016, the disclosures of which are hereby incorporated by reference in their entirety for all purposes.

BRIEF DESCRIPTION OF THE FIGURES

Illustrative embodiments are described in detail below with reference to the following figures:

FIGS. 13A-13C depict using of an animated pictographs;

DETAILED DESCRIPTION

In the following description, for the purposes of explanation, specific details are set forth in order to provide a thorough understanding of embodiments of the disclosure. However, it will be apparent that various embodiments can be practiced without these specific details. The figures and description are not intended to be restrictive.

The present disclosure relates generally to content delivery techniques in audio-visual streaming systems.

I. Streaming Overview

Figure 1:
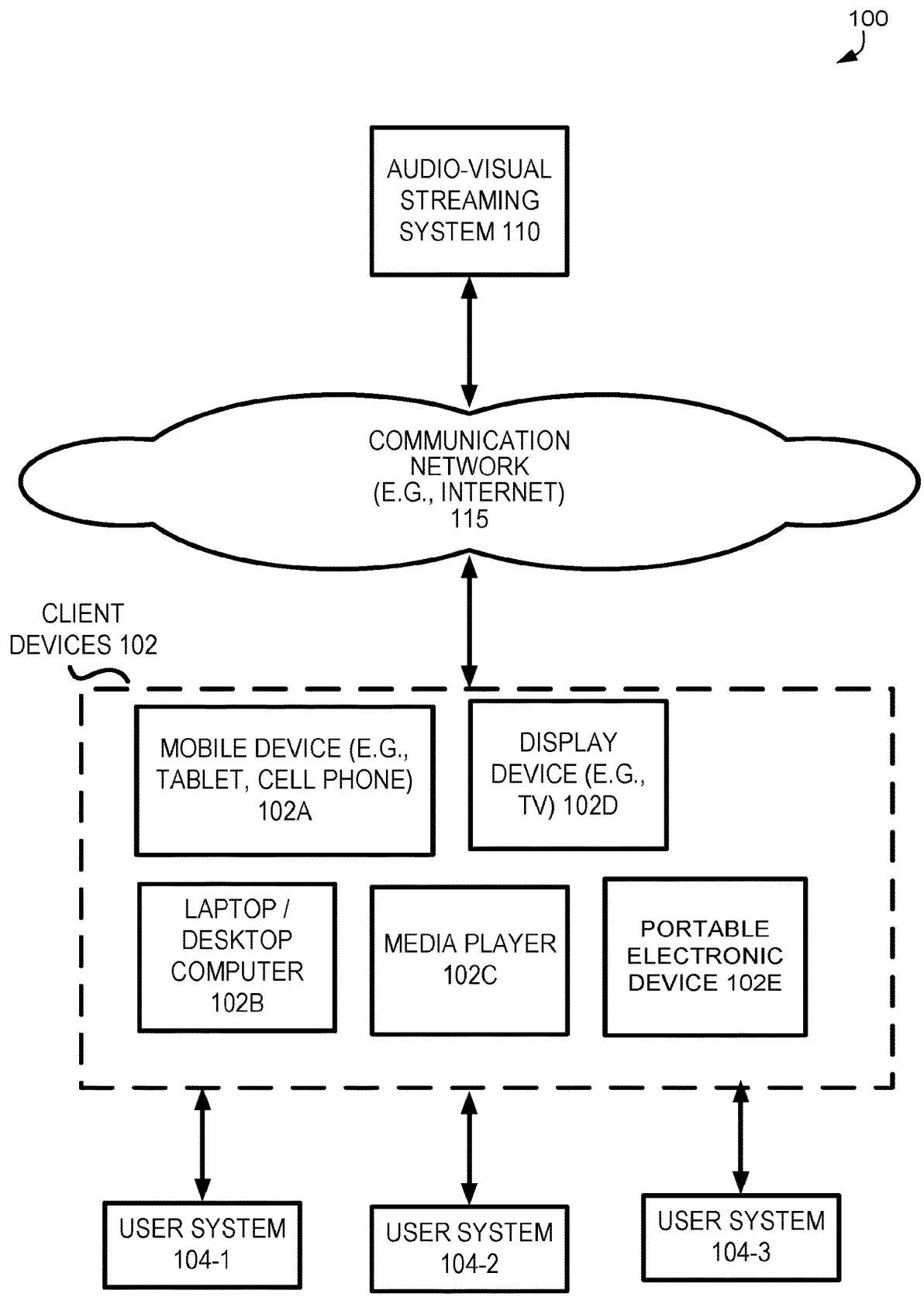
FIG. 1 illustrates an example of an environment for an audio-visual streaming system.

FIG. 1 illustrates an example of an environment 100 for an audio-visual streaming system 110. The environment 100 can include a user system 104. In some embodiments, the user system 104 can use one or more types of client devices 102. In some embodiments, the client devices 102 can be communicatively coupled with the audio-visual streaming system 110 via one or more communication networks (e.g., communication network 115). In some embodiments, the communication network 115 can be the internet.

The entities depicted in FIG. 1 can be implemented by a computing device. In some embodiments, a type of computing device can include a personal computer (PC), a desktop computer, a mobile or handheld device (e.g., a laptop, a mobile phone, or a tablet), a set-top box, a smart television, and any other type of electronic device that can connect to a system over a communication network. For example, the client devices 102 depicted in FIG. 1 include a mobile device 102A, a laptop or desktop computer 102B, a media player 102C (e.g., a set-top box, a DVD player, or a Blu-Ray Player), a display device 102D (e.g., a smart television), and a portable electronic device 102E (e.g., a tablet or cell phone). For further examples, a client device can be a Roku, an Apple TV, a Chromecast, an Amazon Fire, a XBox, a Playstation, a Nintendo, a Connected TV, a computer or mobile device operating a Windows, Mac, and/or Linux operating system, a BlackBerry device, or an Amazon Kindle device.

One or more of the entities described herein can utilize one or more communication networks (e.g., communication network 115) to facilitate communications. The communication network 115 can include one or more networking devices or equipment including but not limited to network switches, routers, bridges, and load balancers. Examples of the communication network 115 can include the Internet, a wide area network (WAN), a local area network (LAN), an Ethernet network, a public or private network, a wired network, a wireless network, a virtual network, or any combinations thereof. Different communication protocols can be used to facilitate communications through the one or more communication networks, including wired and wireless protocols such as the IEEE (Institute of Electrical and Electronics Engineers) 802 suite of protocols, Internet Protocol (IP), TCP/IP (Transmission Control Protocol/Internet Protocol), UDP, RTSP, Asynchronous Transport Mode (ATM), frame relay network protocols, Multi-Protocol Label Switching (MPLS), OpenFlow, IPX (Internetwork Packet Exchange), SAN (Storage Area Network) protocols, AppleTalk, Bluetooth, Long-Term Evolution (LTE), and other protocols.

In an example, a client device of the client devices 102, such as a laptop or desktop computer 102B, can utilize a web browser application to access the audio-visual streaming system 110. In some embodiments, the web browser application can include FireFox, Safari, Chrome, or Internet Explorer. In other embodiments, the web browser application can use an application designed for (or operable using) devices having an operating system such as iOS or Android. In such embodiments, Hypertext Transfer Protocol Live Steaming (HLS) or Progressive/HLS can be used as a video delivery protocol. In some embodiments, Hypertext Transfer Protocol (HTTP) can be used for communications. In some embodiments, authentication tokens can be used for access. In some embodiments, expiring tokens can be used for content-specific URLs. In some embodiments, single-use content URLs, concurrent stream detection, geographic blocking, device invalidation support, secure application storage, and/or audio-visual output protection can be used.

II. Aggregated Video Comments

Figure 2:
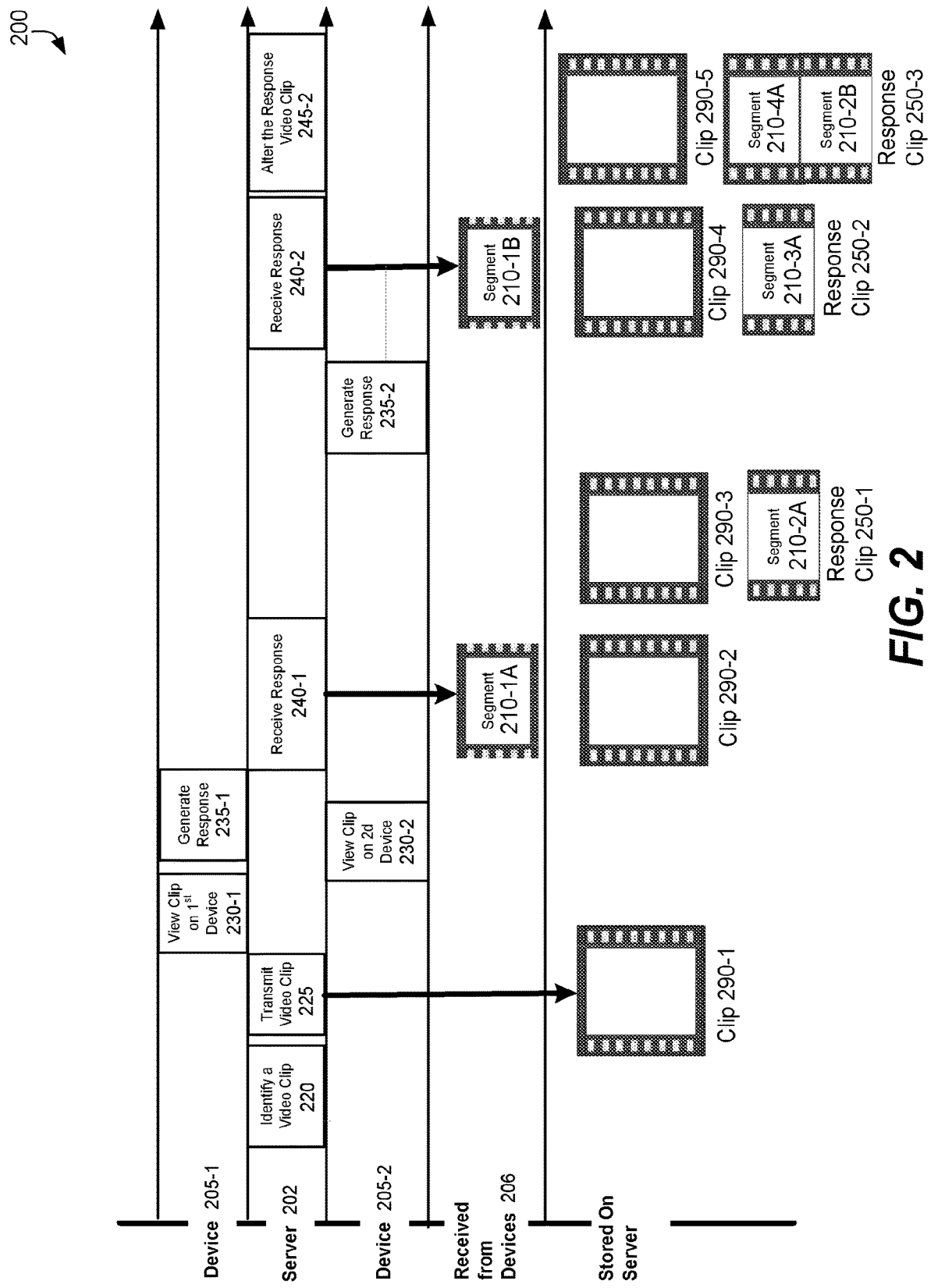
FIG. 2 is a timeline that describes a system for altering a video clip object.

FIG. 2 is a timeline 200 that describes a system for altering a video clip object. In some embodiments, a video clip object can be a collection of one or more video clips. In some embodiments, the one or more video clips can be displayed on a mobile devices together. For example, a video clip object can include a video clip with a question (or other content for which responses can be made). The video clip object can further include multiple response clips that provide answers to the question, and/or provide additional types of responses (e.g., comments). For another example, message video clips can be incrementally aggregated. In such an example, the message video clips can be exchanged between groups of computer systems. For another example, a video clip can be used as a base video. In such an example, one or more other video clips can be displayed as inset videos.

In some embodiments, one or more video clips in a video clip object can be sent to client devices 102 as individual video files. In such embodiments, metadata associated with the individual video files can link the individual video files together for display. In some embodiments, client devices 102 can receive data separate from the individual video files. The data can describe the linkages between the individual video files. In some embodiments, when video objects are displayed at client devices 102, the client devices 102 can display one video clip after another. In some embodiments, one or more video clips in a video clip object can be graphically linked together into a string of videos, with the videos displayed by scrolling up, down, or sideways by user input and/or automatically.

Instead of (or in addition to) sending video clip objects as logically linked collections of video clips, video clip objects can be rendered into smaller collections of files for transmission and display. For example, in a system where question clips and response clips are displayed, the questions clips and the response clips can be rendered into a single video file (and/or multiple video files) for transmission and display. In such an example, the questions clips and response clips can be displayed at a client device by moving forward and/or backward in the video file.

The timeline 200 begins with an identification 220 and a transmission 225 of a video clip object by a server 202. The video clip object can include a video clip 290-1. In some embodiments, the server 202 can be similar to the audio-visual streaming system 110 from FIG. 1.

In some embodiments, the video clip 290-1 can be generated on a client device (e.g., a mobile device 102A, a laptop or desktop computer 102B, and/or other devices capable of generating multimedia). In other embodiments, the video clip 290-1 can be produced by another entity, e.g., a video used to promote a multimedia offering (e.g., a movie and/or a television program). In some embodiments, the video clip 290-1 can be termed a "seed" clip—a question (e.g., "Show off your setup") that is targeted to elicit responses. In some embodiments, a reponse can include one or more responsive video clips.

In some embodiments, the server 202 can identify the video clip 290-1 after the video is uploaded by a user, and/or retrieved from storage. After the video clip 290-1 is stored at the server 202, and handled by the server 202 as a video clip object, the video clip object can be transmitted using a network (e.g., the Internet), to a mobile device 205-1 and a mobile device 205-2 using a similar process as described above.

In some embodiments, the video clip object can be displayed (230-1) using a mobile device 205-1. For example, a user can select the video clip object for playback and watch the video. In this example, upon seeing the video with the seed question, the user can answer the question and/or comment. Using embodiments described herein, the user can record a response video clip 250-1. In this example, the response video clip 250-1 can be a short video showing content (e.g., a person speaking) that is in response to the video clip 290-1. In some embodiments, response video clip 250-1 can be transmitted to the server 202 (not shown), and the server 202 can receive (240-1) the response video clip 250-1. In some embodiments, the response video clip 250-1 can include metadata that associates the response video clip 250-1 with the video clip 290-1. The metadata can be created by a client device upon creation of the response video clip 250-1. While the response video clip 250-1 can be generated by a user, the video clip object can be viewed (230-2) by another user using a second mobile device (similar to a mobile device 205-2).

While FIG. 2 illustrates two devices, and two response video clips, more than two devices and/or more than two response video clips can be present. As discussed further with FIG. 4 below, the server 202 can select one of one or more response video clips on the server 202. In some embodiments, the selection can be performed by selecting: a first response video clip, a response video clip from a particular system user (e.g., an important system user based on a number of posts by the important system user), a random response video clip. In other embodiments, the selection can be based on popularity (e.g., number of user votes), what is trending, a most recent response video clip submitted, a response video clip based on a location of user and/or creation of the response video clip, past user interests, user preferences and/or other similar ways of selecting video segments.

Figure 3:
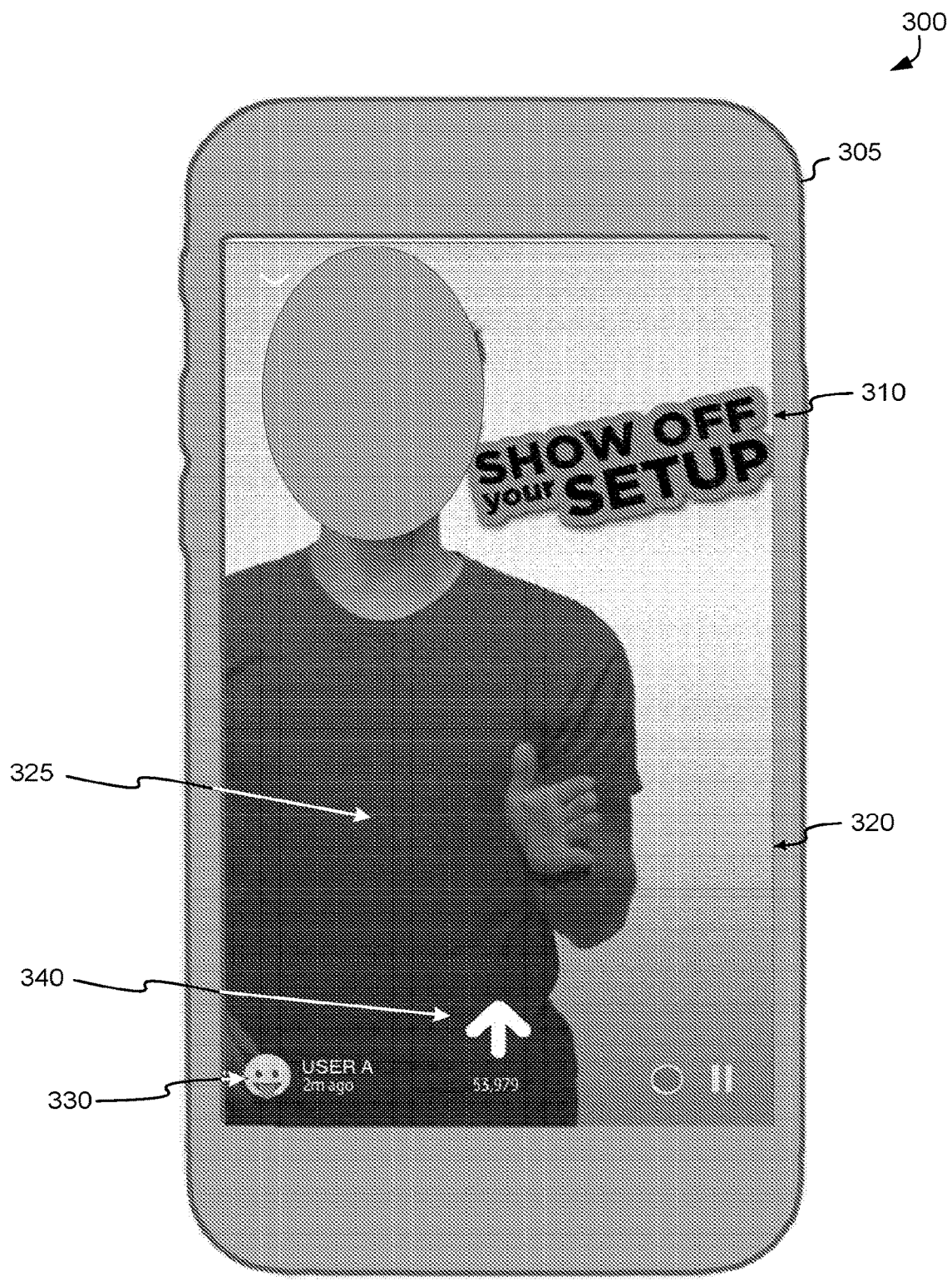
FIG. 3 depicts a mobile device displaying a video clip.

FIG. 3 depicts a mobile device 305 displaying a video clip 325. In some embodiments, the mobile device 305 can include a screen 320, where the video clip 325 is displayed. In some embodiments, the video clip 325 can be similar to video clip 290 from FIG. 2. The video clip 325 can be uploaded (e.g., to the audio-visual streaming system 110) by a user system (e.g., user system 104-1, here associated with the label User A 330). In some embodiments, the video clip 325 can present a "seed" question (e.g., "Show off your setup" 310). In some embodiments, an arrow 340 can allow a user to "upvote" the video clip 325—add their support to the video clip 325. As noted above, the upvote can be used to arrange the video clips 290 within a video clip object 295.

Figure 4:
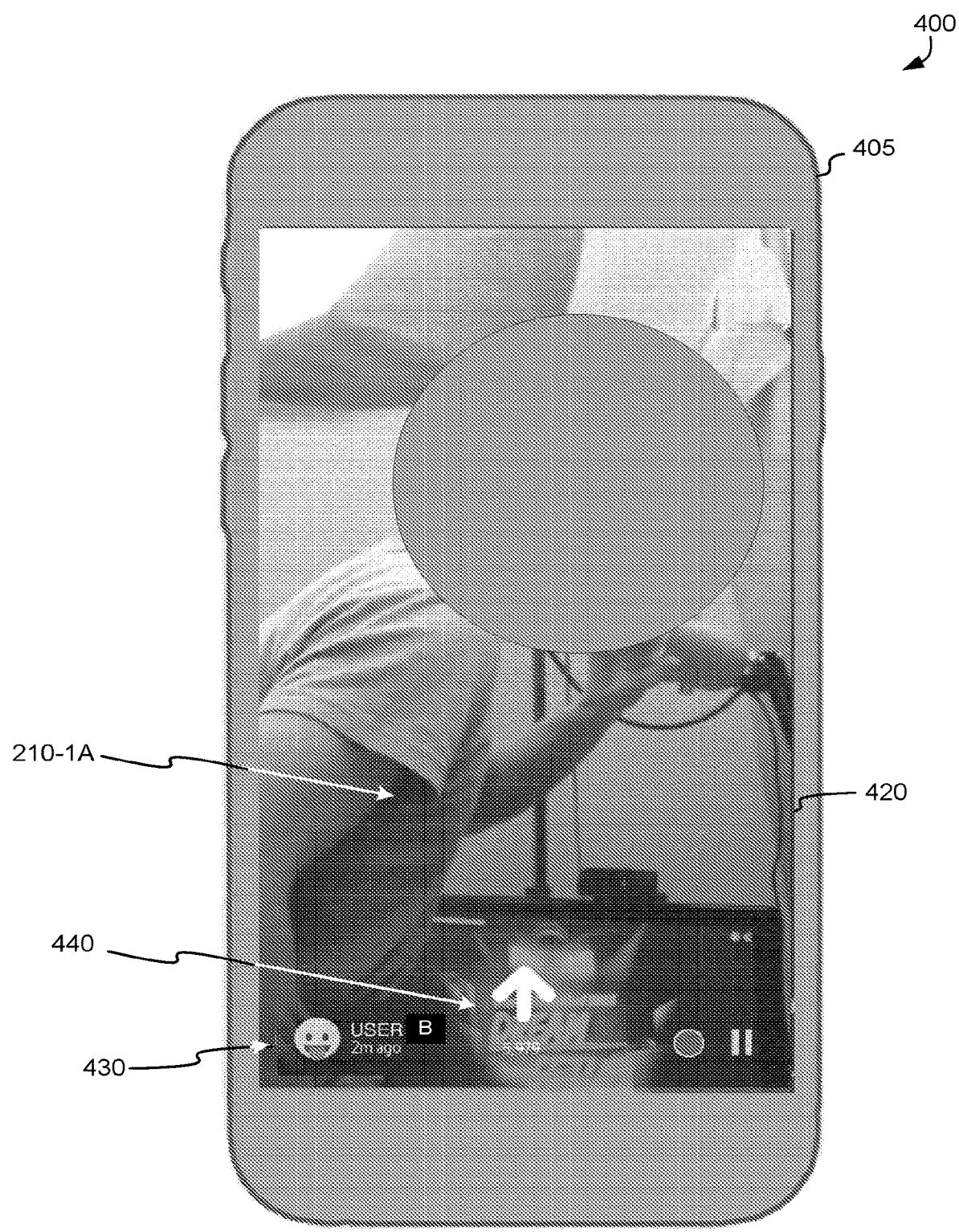
FIG. 4 depicts a mobile device displaying a response video clip uploaded by a user system.

FIG. 4 depicts a mobile device 405 displaying a response video clip 250 uploaded by a user system (e.g., user system 104-3, here associated with the label User B 430). In some embodiments, the mobile device 405 can include a screen 420, where the video clip 425 is displayed. In some embodiments, after watching the video clip 325 (230-1), User B 430 can select a reply option. In response to selecting the reply option, a response video clip 250-1 (e.g., with a camera on the mobile device 405) can be generated (235-1).

In some embodiments, while a User B is viewing and responding to a video clip, one or more other users can also view the video clip 290 on one or more other devices (e.g., a mobile device 205-2) (230-2). In such embodiments, a response video clip 250 can be generated (235-2), and the response video clip 250 can be transmitted to (not shown), and received (240-2) by the server 202. In some embodiments, after response video clip 250-1A is received, video clip object 295 can be altered by the server 202 to include the response video clip 250 (not shown). As described above, some embodiments update a database that describes the content of video clip objects. Other embodiments render the two video clips together into a single file. And other embodiments perform a similar combination of actions. Some embodiments can also attach metadata to the response video clip 250 that links the response video clip 250 to the video clip 290.

As shown in FIG. 2, after response video clip 250-2A is received by the server 202, server 202 can hold a video clip object 295-4, which includes three video clips (290-5, 250-1D and 250-2B. In some embodiments, at different intervals, the server 202 is configured to alter video clip object 295 to include new response video clips (similar to the response video clip 250), remove video clips, and/or reorder video clips within the video clip object 295.

Because of a potentially large number of response video clips (similar to the response video clip 250) that can be received, some embodiments can improve an operation of the server 202 by automatically selecting a subset of all the response video clips (such as the response video clip 250) received. The selection can be performed by selecting the segments in order, selecting segments from certain system users, selecting random segments, and/or other ways of selecting video segments.

In addition, to improve system efficiency and user satisfaction, as discussed above, the response video clips (similar to the response video clip 250) can be automatically sorted to rearrange the order in which the response video clips (such as the response video clip 250) are ordered for presentation, e.g., the logical order discussed above, or the order video clips appear in a video file. It should be appreciated that different orders for video clips can be set at any time, for any reason, e.g., user preferences, location, upvotes, and/or other relevant factors. Different orders for video clips can be automatically set for each user, based on the respective characteristics of a user.

Figure 5:
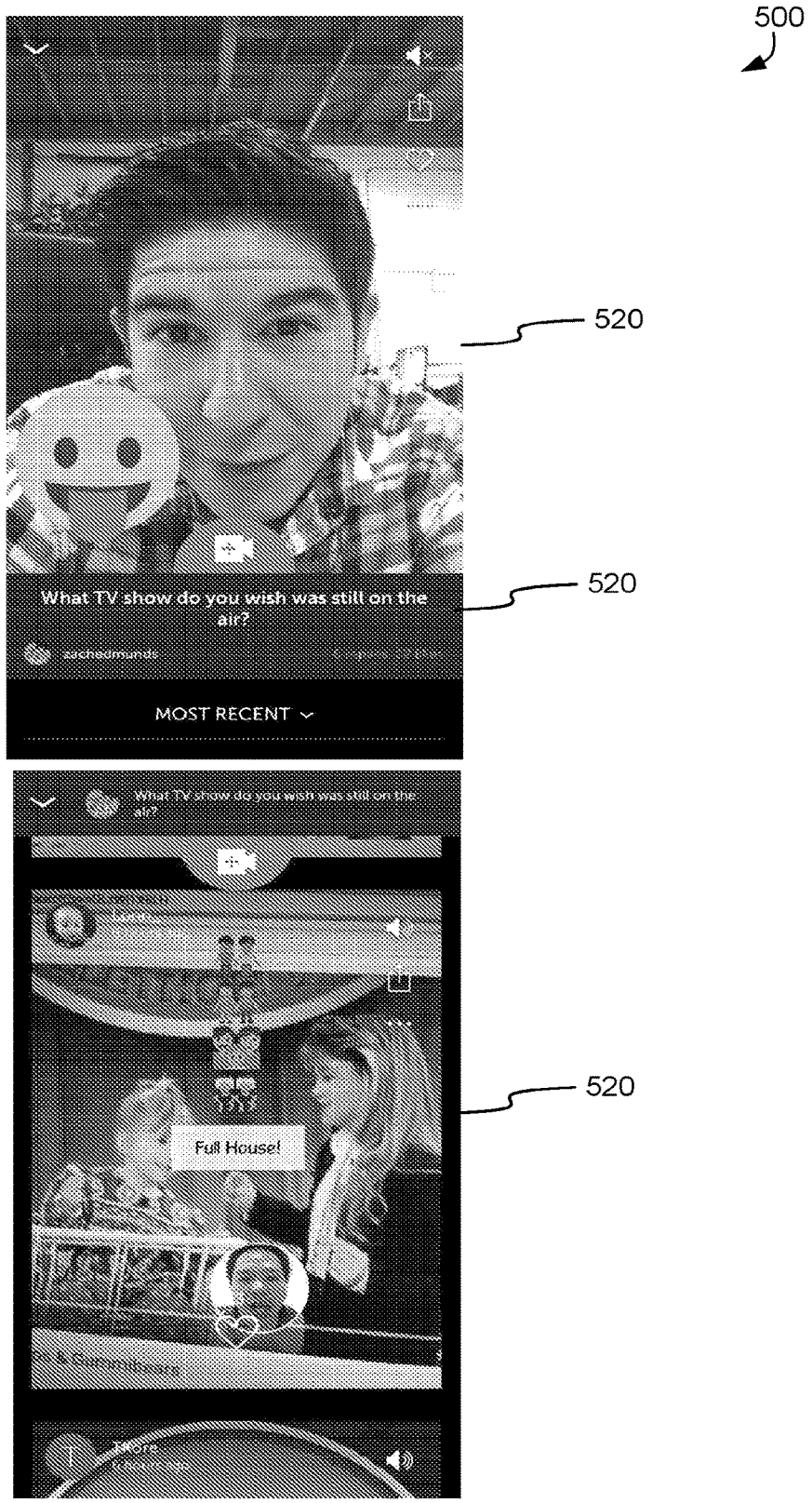
FIG. 5 depicts multiple video clips linked together into a string of videos for display on a user interface.

FIG. 5 depicts multiple video clips (a video clip 520 and a response video clip 525) linked together into a string of videos for display on a user interface (e.g, a mobile device 102A screen). It should be noted that video clip 520 includes a question ("What TV show do you wish was still on the air?") and response video clip 525 includes an answer ("Full House!").

Figure 6:
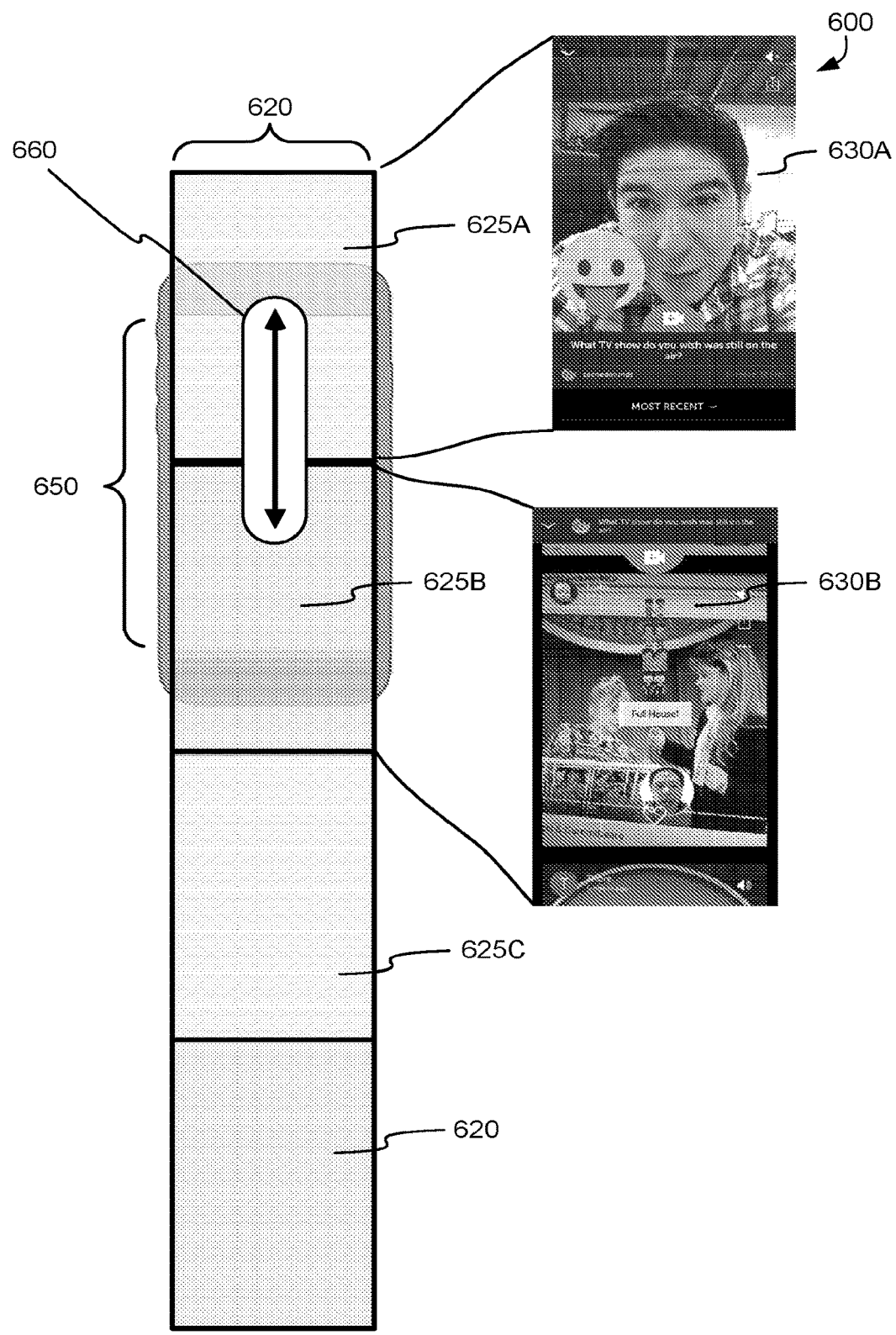
FIG. 6 depicts display of a chain of clips on a mobile device.

FIG. 6 depicts display of a chain of video clips (621, 625) on a mobile device 650. In some embodiments, the mobile device 650 can include a screen, where the video clips are displayed. In some embodiments, a video string 620 (similar to the string of videos discussed above) can be handled as a video clip object. As the sensor screen of mobile device 650 is manipulated (e.g., up and down 660), the video string 620 can become visible on the screen of the mobile device 650. In some embodiments, as response video clip can enter a visible portion on the screen. In such embodiments, the response video clip can play, or begin after a certain portion is displayed. In some embodiments, video clip 621 can continue to play as it leaves the visible portion.

Figure 7:
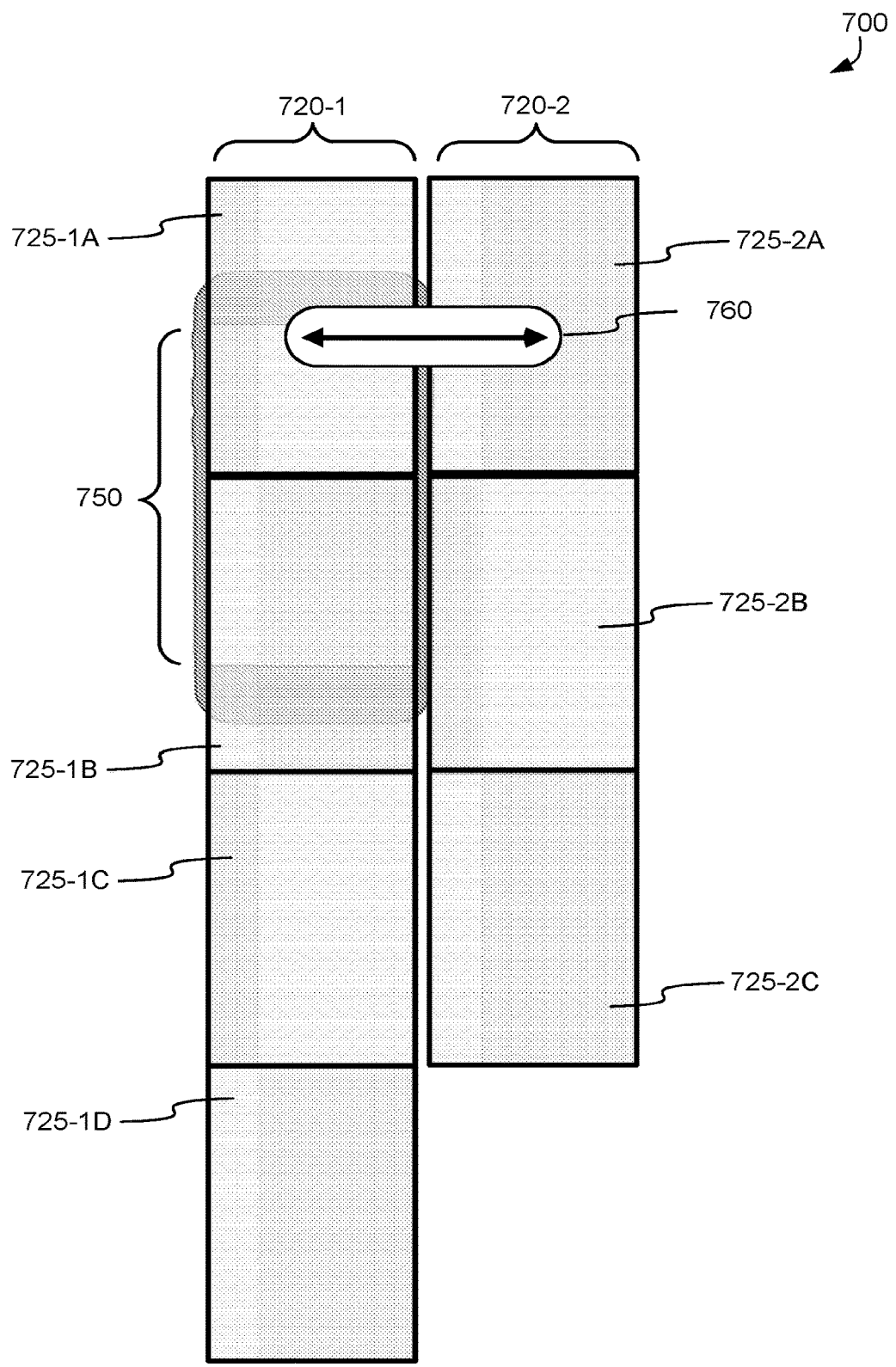
FIG. 7 depicts a view of two video strings.

FIG. 7 depicts a view of a first video string 720-1 and a second video string 720-2. In some embodiments, video clips 725-1A, 725-1B, 725-1C in the first video string 720-1 can be displayed in visible portion 750, as described in FIG. 6. In some embodiments, when the screen sensor is manipulated (e.g. side-to-side 760), the second video string 720-2 can become visible and play the video clips 725-2A, 725-2B, 725-2C.

III. Aggregated Video Messaging

Figure 8:
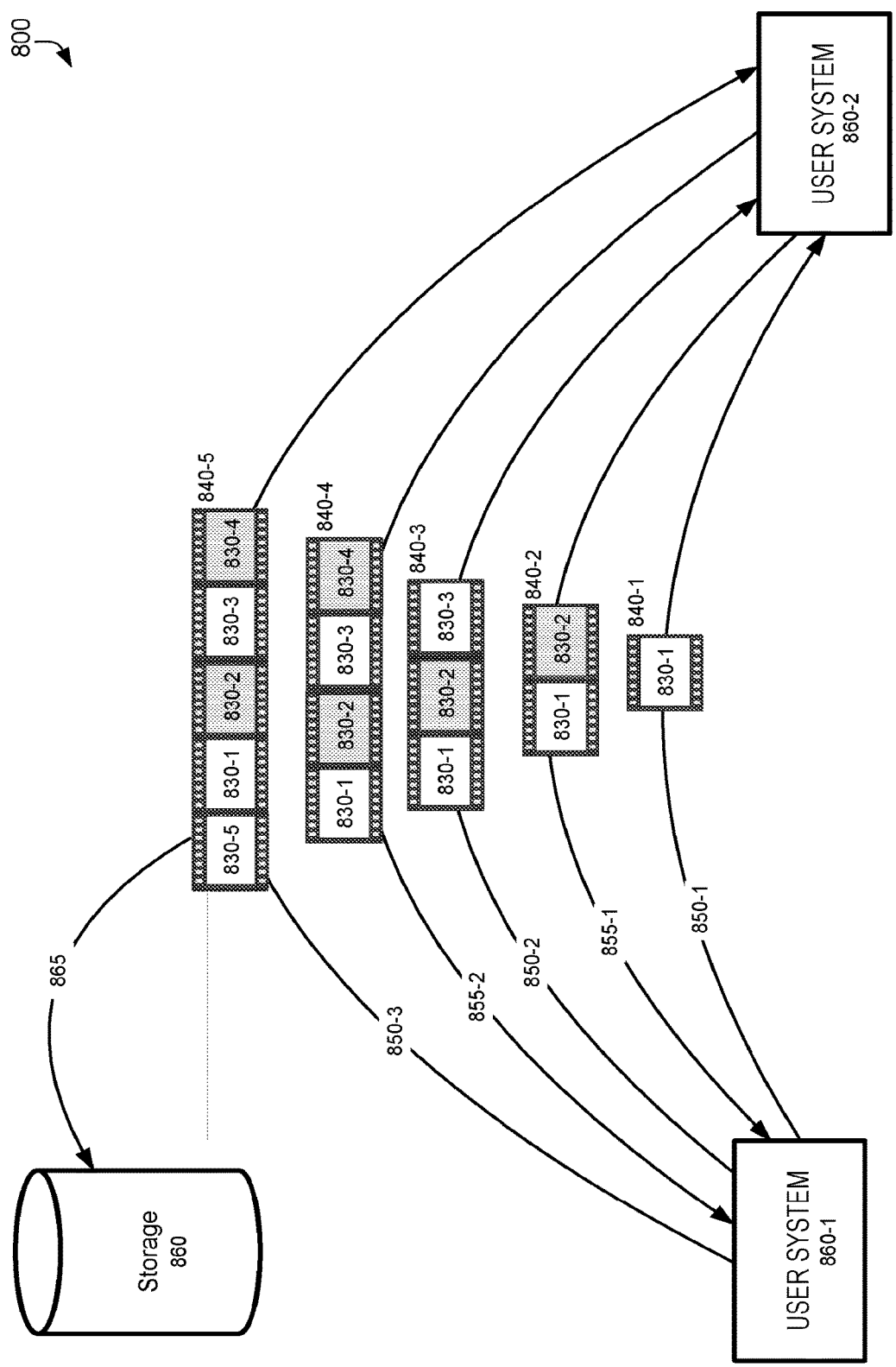
FIG. 8 depicts an exchange and aggregation of message video clips.

FIG. 8 depicts an exchange and aggregation of message video clips. FIG. 8 includes two user systems (e.g., 860-1, 860-2). The two user systems can send messages to each other in a sequence of communications (e.g., 860-1, 855-1, 850-2, 855-2, 850-3). It should be appreciated that, in some embodiments, the communications (e.g., 850, 855) can be facilitated using the structure depicted in FIG. 1, e.g., with communications 850, 855 managed and facilitated using a server similar to audio-visual streaming system 110 (not shown).

In some embodiments, user system 860-1 can transmit a message video clip object 840-1 to user system 860-2. In some embodiments, the message video clip object 840-1 can include a video clip 830-1. The video clip 830-1 can include content (e.g., "How are you?") that contains a message directed to one or more specific user systems (e.g., user system 860-2). User system 860-2 can receive the message video clip object 840-1. In some embodiments, user system 860-2 can identify a reply message video clip 830-2, in response to the message video clip object 840-1. In some embodiments, the reply message video clip 830-2 can include content that contains a reply message directed to the user system that sent the message video clip object 840-1 (e.g., "I am fine, what are you up to?"), such reply being generated by user system 860-2 (e.g., using the camera on a mobile device).

In some embodiments, the audio-visual streaming system 110 can alter the message video clip object 840-1 to include the reply message video clip 830-2, resulting in a message video clip object 840-2. In some embodiments, the alteration can occur at the user system 860-2. In some embodiments, the video clip 830-1 and the reply message video clip 830-2 are not altered, rather they are logically linked in the message video clip object 840 such that they can be presented by the audio-visual streaming system 110 in the sequence shown. Continuing for communications 850-2, and 855-2, in some embodiments, the message video clip object 840 increases in size during each pass.

In communication 850-3, user system 860-1 can be configured to reorder the video clips 830 of message video clip object 840-5. It should be appreciated that the message video clip object 840, composed of video clips 830, can be automatically reordered by embodiments based on different criteria. For example, in some embodiments, video clips 830 can be prioritized. User system 860-1 can be configured to place a video clip 830-5 at the beginning of a message video clip object 840-5 based on an assigned priority.

In some embodiments, at the end of a sequence of communication (e.g., communications 850, 855) message video clip object 840-5 can be stored 865 (e.g., in storage 860) for later retrieval and viewing.

In some embodiments, the communications 850, 855 can be point-to-point communications. In other embodiments, the communications 850, 855 can be point to multipoint (e.g., a third user system also receives the contents of one or more communications 850 and/or 855). In other embodiments, the communications can be multipoint to multipoint. In some embodiments, communications 850, 855 are not to be considered broadcast communications (e.g., the message video clip 840 is not available to the Internet and/or user systems to which communications 850, 855 were not directed).

IV. Inset Video Commenting

Figure 9:
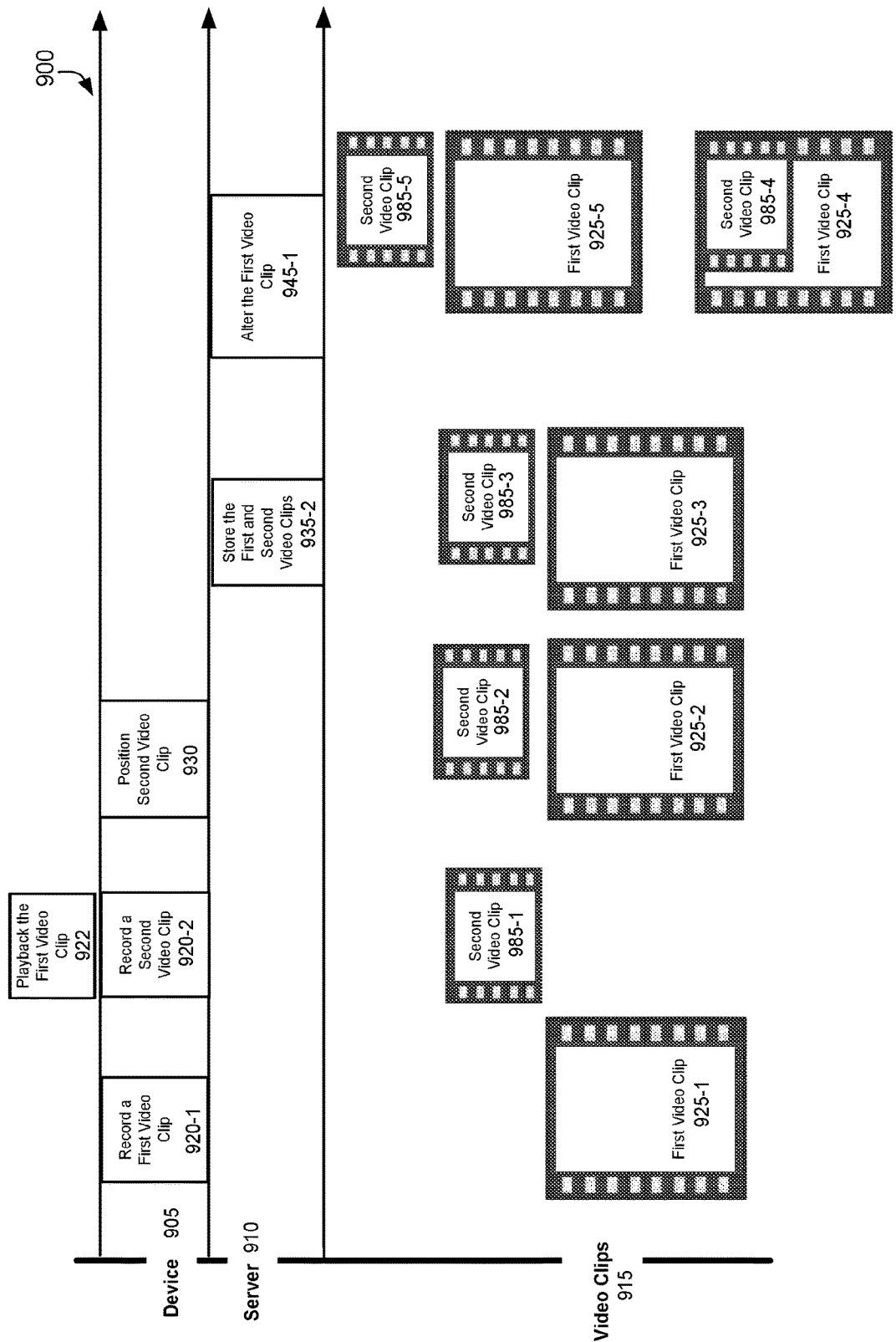
FIG. 9 is a timeline that describes a system for altering a video clip.

FIG. 9 is a timeline that describes a system for altering a video clip. The timeline can begin with a recording 920-1, at a computing device, of a first video clip 925-1. In some embodiments, the first video clip 925-1 can be captured at a device 905 (e.g., similar to a client device of the client devices 102). After the first video clip 925-1 is recorded, the first video clip 925-1 can be played back and reviewed at the device 905. In other embodiments (not shown), the first video clip 925-1 can be generated by a different entity, and loaded by device 905. When an option is selected at the computing device, a simultaneous playback 922 of the first video clip 925-1 and a recording 920-2 of a second video clip 985-1 can occur. In some embodiments, during the recording/playback, a small window is overlaid on top of the first video clip 925-1 and a live recording can be shown. In some embodiments, instead of recording the second video clip 985-1, the system can enable a user to load a pre-recorded video. In some embodiments, multiple video clips 985 can be generated and shown for a video clip 925. These can be displayed in different combinations of inset displays, e.g., simultaneously and/or sequentially (one clip finishes, the other begins at the same or a different part of the screen). In some embodiments, a viewer of a video clip (such as the video clip 925) with inset video (such as the video clip 985) can swap the position of the clips with a user interface option (or the system could automatically switch them).

Figure 10:
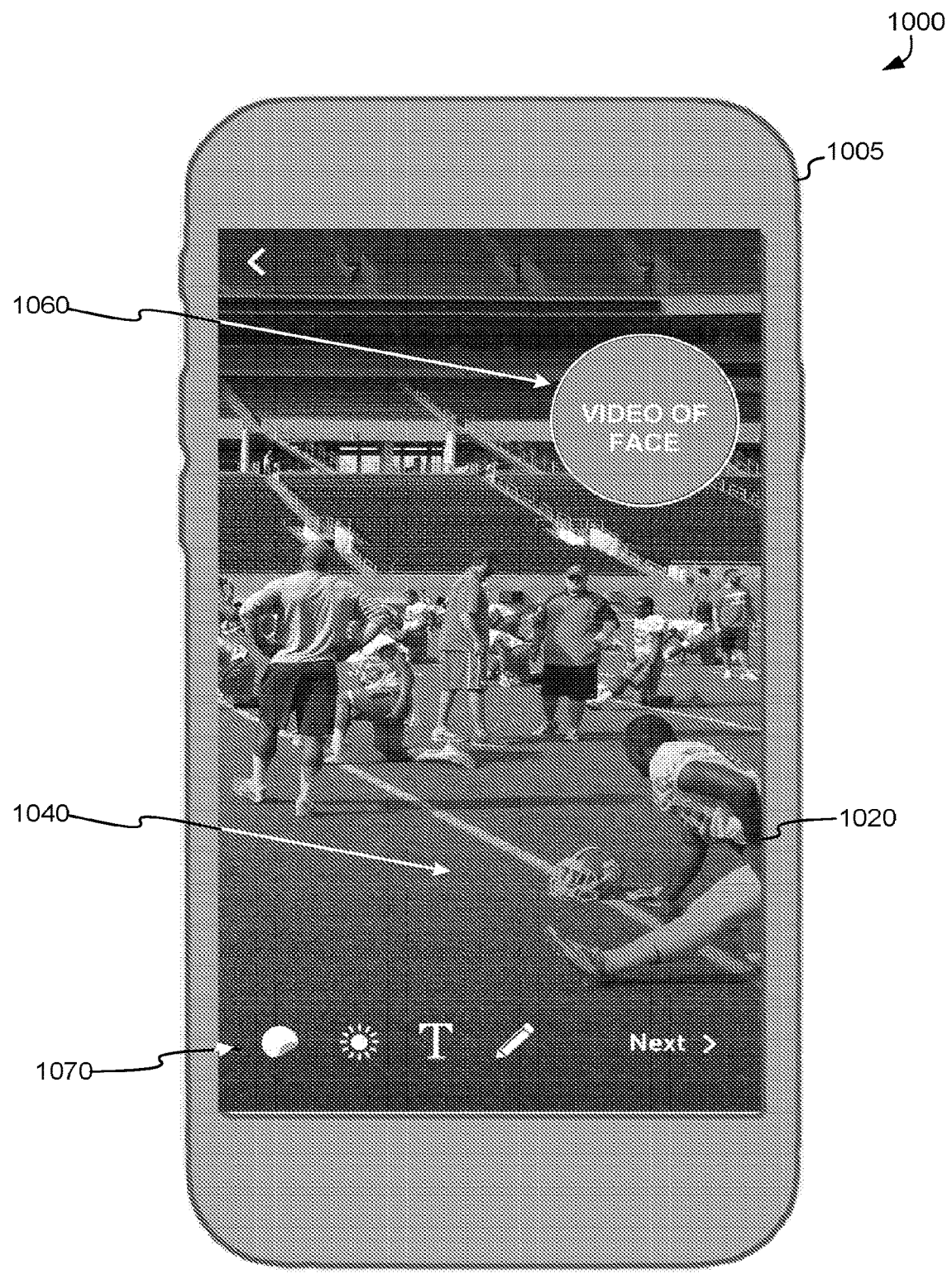
FIG. 10 depicts a mobile device displaying a first video clip and a second video clip.

FIG. 10 depicts a mobile device 1005 displaying a first video clip 1040 and a second video clip 1060 positioned and inset into the first video clip 1040. In some embodiments, the mobile device 1005 can include a screen 1020, where the video clips are displayed. In some embodiments, the user interface that is displayed while the second video clip 1060 can be recorded by a camera (not shown) on the mobile device 1005. In some embodiments, the recording of the second video clip 1060 can lasts as long as a running time of the first video clip 1040. In some embodiments, recording of the second video clip 1060 can continue after the first video clip 1040 has completed playing.

Returning to FIG. 9, the two video clips (the first video clip 925 and the second video clip 985) can be stored (935-2), and used together or separately for other operations. In some embodiments, once both video clips (925 and 985) can be recorded; metadata can be stored and associated with the video clips. The metadata can describe a position of a window for video clip 1060 to be displayed during simultaneous playback. As noted above, the video clips can be managed by some embodiments as a video clip object.

In some embodiments, as shown with the combination of second video clip 985-4 and first video clip 925-4, the first video clip 925-4 can be altered by rendering the second video clip 985-4 to be displayed at the position specified by the position metadata described above. In some embodiments, the position metadata (not shown) can be stored as a part of one of the video clips, or can be stored for use in a database. As described above, this approach can be used for any of the embodiments having multiple video clip described herein.

In some embodiments, as shown with first video clip 925-5 and second video clip 985-5, both video clips can be stored separately and, upon request to be played by a requesting user system, both video clips can be sent out separately, and rendered together at the user system. In such embodiments, the alteration of the first video clip 945-1 can occur at the user system, under the direction of server 910. This approach can also be used for any of the embodiments having multiple video clip described herein.

Figure 11:
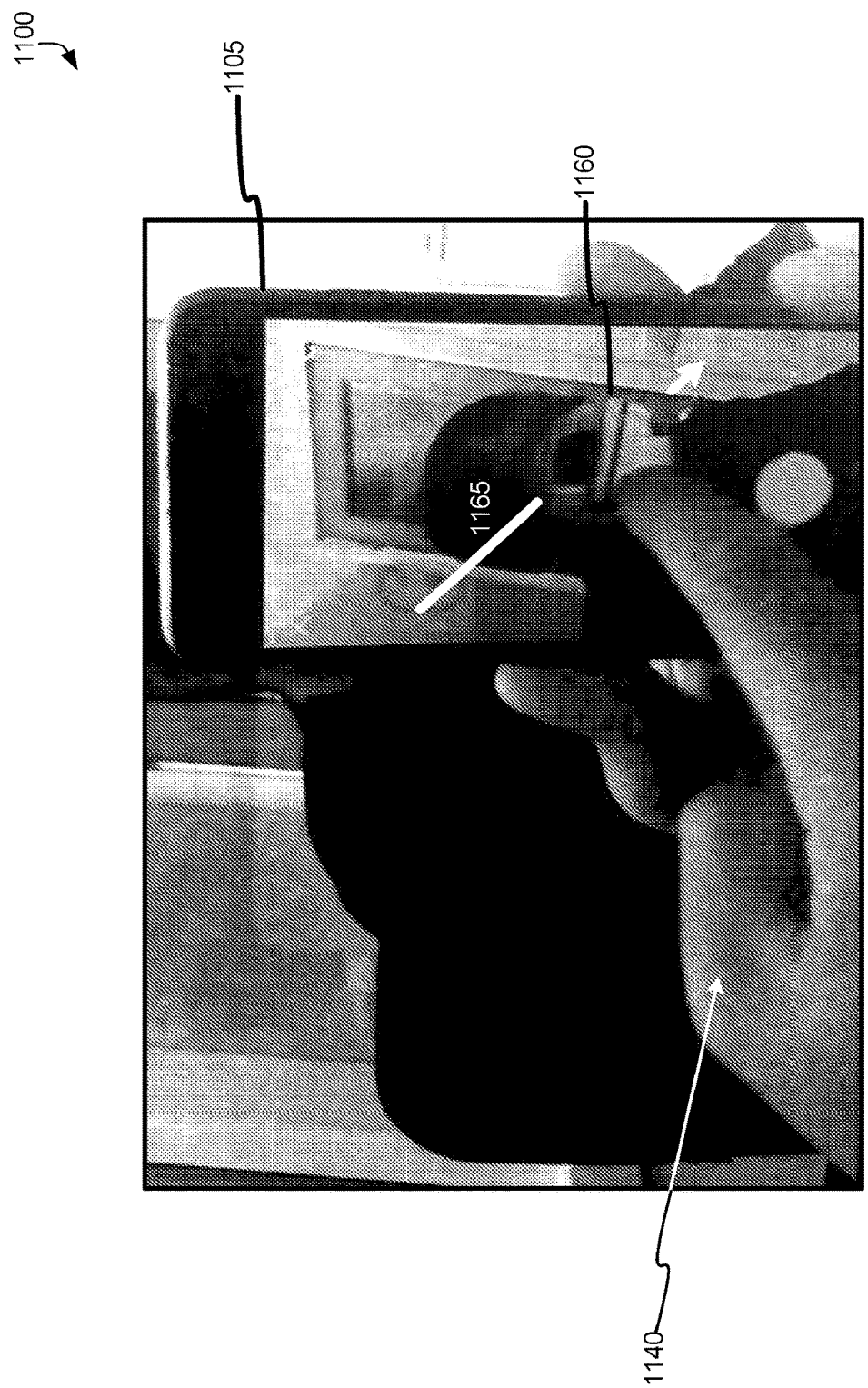
FIG. 11 depicts an operation where a user repositions a window of a second video clip before, during and/or after the recording of the second video clip.

FIG. 11 depicts an operation where a user 1140 repositions a window of a second video clip 1160 before, during and/or after a recording of the second video clip 1160. As shown, a repositioning can be performed using a drag-and-drop operation 1165 on the touch screen of mobile device 1105. Returning to FIG. 9, the drag-and-drop operation, positioning the second video clip 930, can be shown being performed on device 905 after recording.

V. Animated Pictographs

Figure 12:
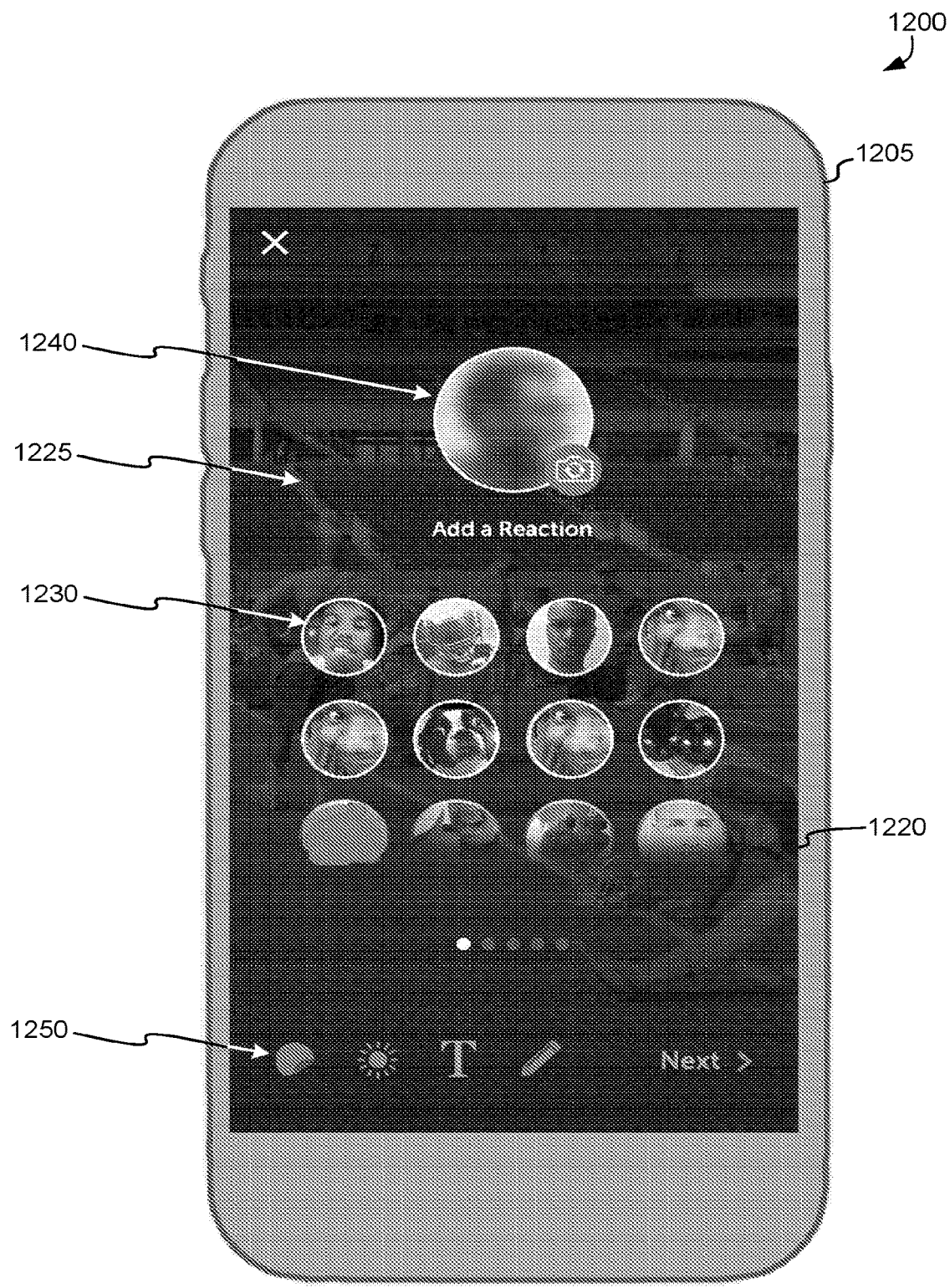
FIG. 12 depicts a mobile device displaying animated pictographs.

FIG. 12 depicts mobile device 1205 displaying animated pictographs 1230. In some embodiments, the mobile device 1205 can include a screen 1220, which displays the animated pictographs 1230. In some embodiments, at a user system, a user can be able to record a video clip (e.g., of themselves or some other scene), and the video clip can be transformed into an animated pictograph, e.g., as shown in FIG. 12. In some embodiments, the animated pictographs 1230 can be animated when shown. The animation can occur at the user system, or can be performed at a system similar to audio-visual streaming system 110.

In some embodiments, to create the animated pictographs 1230, a user (before, during and/of after a video 1225 is displayed) can select an "Add a Reaction" user interface button, and a recording can begin. In some embodiments, when the "Add a Reaction" user interface button is selected, a reaction can be displayed in window 1240. Once the recording is completed and the video clip is transformed, the animated pictographs 1230 can be stored for further use. In some embodiments, the animated pictographs 1230 can be used for a variety of application uses, e.g., the video clip comments described above with the descriptions of FIGS. 2-12.

FIGS. 13A-13C depict using an animated pictograph, e.g., adding a pictograph to a video (either generated by a user or received by the user from a system). FIG. 13A illustrates an example of a user selecting an overlay 1360 for an animated pictograph 1370. Once selected, as shown in FIG. 13B, a user can move 1365 the overlay 1360, scale (not shown) the overlay 1360, and place the overlay 1360 over the animated pictograph 1370. As shown in FIG. 13C, the overlay 1360 can be placed, such that a feature of a pictograph (e.g., the animated face) can be shown. In some embodiments, a combination of a pictograph and the overlay 1360 (the animated pictograph 1370) can be used with a video, and/or stored for use with other system multimedia, e.g., in a response video segment described with FIGS. 1-4 above. This approach can also be used for the inset videos described above with FIGS. 9-10.

VI. Polling in Video

Figure 14:
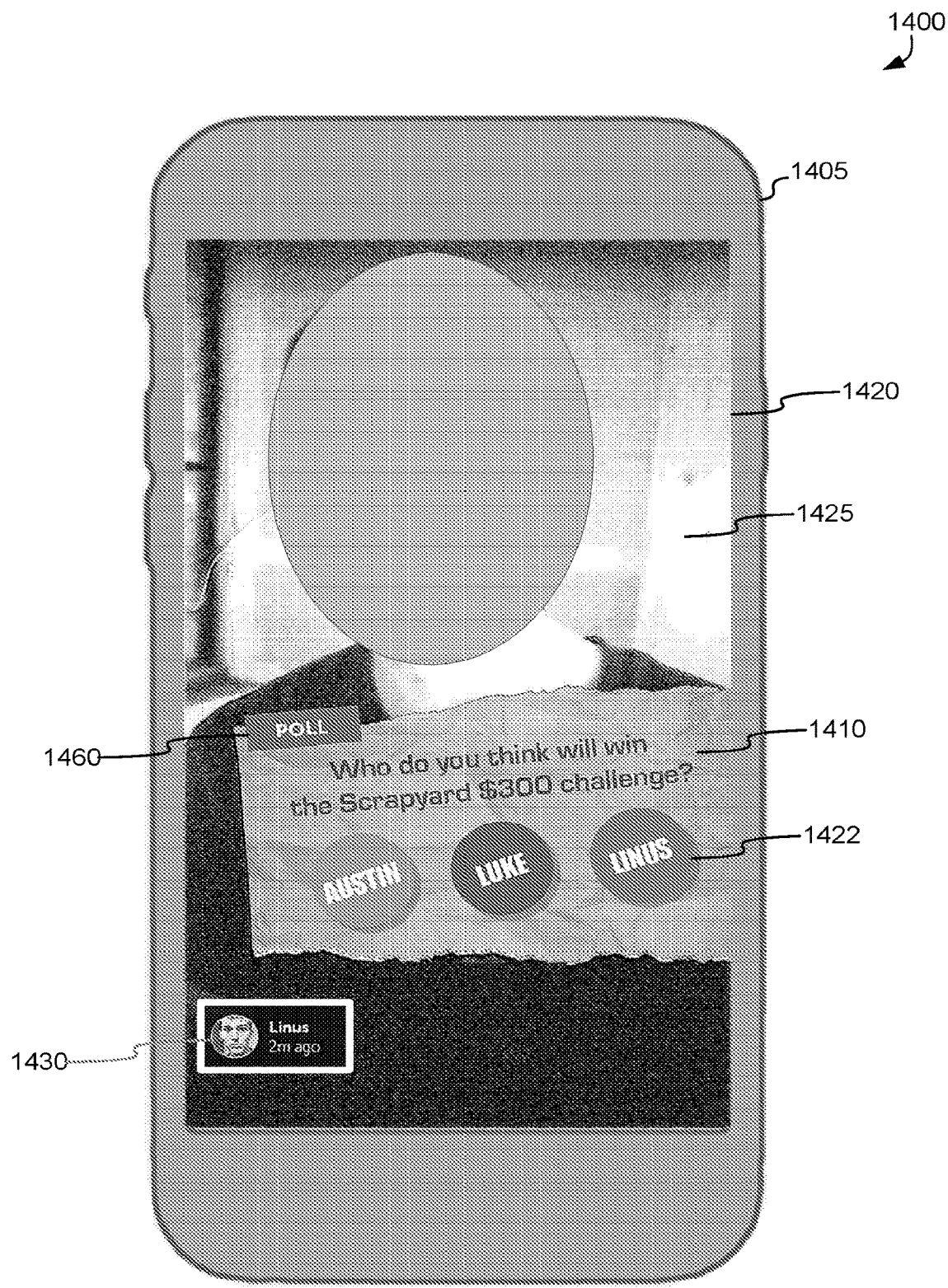
FIG. 14 depicts a mobile device displaying a video clip.

FIG. 14 depicts mobile device 1405 displaying a video clip 1425. In some embodiments, the mobile device can include a screen 1420, where the video clip 1425 is displayed. In some embodiments, a user (e.g., User A 1430) can upload a video of themselves describing a particular question. For example, an event called a "Scrapyard $300 Challenge" can be described. As would be appreciated by one having skill in the art, given the description herein, a video clip 1425 can include any content.

In some examples, a user A 1430, before, during, and/or after recording the video clip 1425, can select and configure an overlay that requests a user viewing the video clip 1425 to select an answer to a question. Configuring the overlay can include specifying the text of the question, the number of choices, and the text associated with each choice 1422. Similar to the process described with FIG. 9 above, the overlay 1410 can be stored separate from video clip 1425 and rendered at a viewing user system, or can be rendered into a combined video and served in this form. Metadata can be included in some embodiments, including position information for the overlay 1410 and/or the "hotspots" in the user interface that allows the choice 1422 buttons to be selected.

As would be appreciated by one having skill in the relevant art(s), given the description herein, the selections of choices (such as choice 1422) by viewing users can be collected at an audio-visual streaming system (e.g., similar to audio-visual streaming system 110 from FIG. 1), and results can be provided to user A 1430, and/or other entities.

VII. Text Cards

Conventionally, messages received by a user from one or more users in a group are organized in a temporal fashion. In particular, messages are organized from a least recent to a most recent with no regard to content of each message. Such organizations can cause difficulties with keeping track of different topics in the group. For example, a first user in the group can post a first topic that includes a question. A second user can then post a second topic that includes another question. Both topics can be arranged one after another. Then, an answer by a third user can be posted after the two topics. However, the answer can be ambiguous as to which question the answer is associated with.

Embodiments herein allow users to designate a new topic within a messaging application when sending a message. For example, a user can select that the user wants to create a new topic by selecting that the message is a topic message. Other messages in the messaging application can be replies to one or more topic messages. In the description herein, a topic message is also referred to as a text card. By using text cards, messages can be organized based on groups of messages. For example, a text card can allow a user to send one or more users the text card such that one or more messages associated with the text card are kept together with the text card.

A. Creating a Text Card

A user can create a text card by indicating to an application that the user wants to create the text card. For example, the application can include a button that allows the user to create a text card. The indication can be sent to a system hosting the application. In some examples, an object can be created on the system to represent the text card. The object can link the text card with the user and one or more other users that the user wishes to share the text card with. By linking the text card with the one or more other users, the text card, and messages associated with the text card, can be viewed by the one or more other users. The text card can appear to the one or more other users as a message in a thread, or conversation. In some embodiments, a first user of the one or more other users can be linked to the object by the object including an identifier of the first user in the object.

In some examples, rather than linking the object directly to the one or more other users, the user can choose to send the text card to one or more groups. The one or more groups can be selected when the user creates the text card. Each group can include one or more pre-identified users. In some examples, the group can be created by the user, by a second user, or be automatically created by the application based on similar interests or characteristics of users. In such examples, the object can be linked to a group by including an identifier of the group in the object.

When the text card is posted, the users in the group can view the text card. In some examples, a thread (or conversation, or an interaction between the users) can include two or more text cards. In such instances, the thread can list the two or more text cards in a temporal fashion. For example, a first text card that was posted first can be in a position indicating that the first text card was posted least recent. In such an example, a second text card can be posted such that the second text card is in a position indicating that the second text card was posted after the first text card.

Figure 15B:
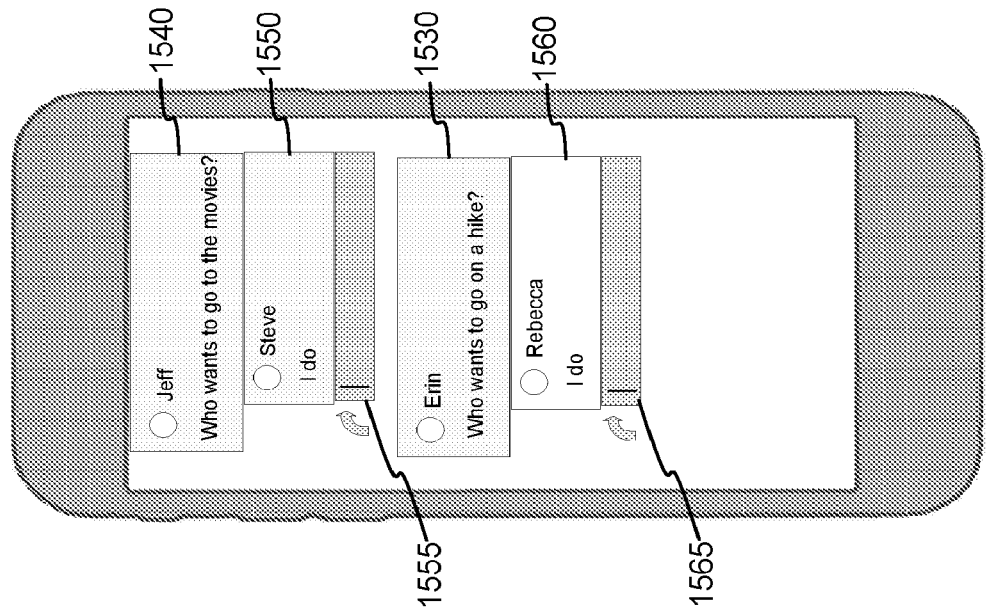
FIGS. 15A-15B illustrate an example of text cards.
Figure 15A:
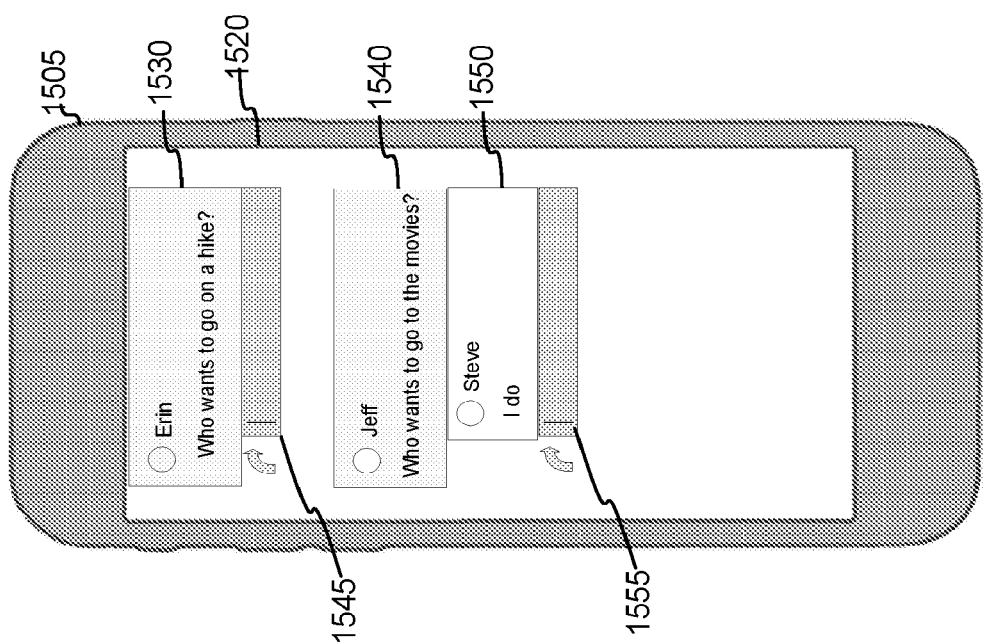

FIG. 15A illustrates an example of text cards. As shown, one or more text cards can be displayed on a screen 1520 of a mobile device 1505. The one or more text cards on the screen 1520 can be associated with each other. For example, a first text card and a second text card can be associated with a conversation between a number of users (e.g., two, three, or more users). In another example, the first text card and the second text card can be associated with a common topic. In such an example, the first text card can be about a first movie while the second text card is about a second movie.

In some examples, the first text card and the second card can be associated with a single conversation and different topics. For example, the screen 1520 can include a first text card 1530. The first text card 1530 can be posted by a first user (e.g., Erin). The first text card 1530 can be associated with a first submission box 1545. The first submission box 1545 can allow a user to respond to content of the first text card 1530. The content of the first text card 1530 can includes a message (e.g., "Who wants to go on a hike?").

The screen 1520 can further include a second text card 1540. The second text card 1540 can be posted by a second user (e.g., Jeff). The second user can be the same as or different from the first user. The second text card 1540 can include content. For example, the content of the second text card 1540 can include a message of "Who wants to go to the movies?".

B. Posting a Reply

After a user views a text card, the user can reply to the text card. The reply to the text card can be associated with the text card such that the text card and the reply are grouped together on the screen 1520 for others to view. In some examples, a reply, or a link to the reply, is added to the object associated with the text card.

Looking at FIG. 15, a second text card 1540 can be associated with a reply 1550. The reply 1550 can be posted by a third user (e.g., Steve). The third user can be the same as or different from the first user and the second user. The reply 1550 can include content (e.g., a message of "I do"). The reply 1550 can be associated with a second submission box 1555. The second submission box 1555 can allow a user to respond to the content of the second text card 1540.

The reply 1550 can be visually indicated as a most recent post to the one or more text cards (e.g., the conversation between people). For instance, the visual indication can include a position on a screen (e.g., the most recent post can be located at a bottom of a screen) or a physical transformation (e.g., a color of the reply can change color). The visual indication can also include both position and a physical transformation. A most recent text card, and/or post, to the screen 1520 can also include a visual indication.

By grouping responses to a text card, a user can easily follow an idea or thread in a visual manner. Rather than having to decide whether the reply 1550 of Steve is associated with the first text card 1530 or the second text card 1540, a user can easily see that the reply 1550 of Steve is associated with the second text card 1540.

FIG. 15B illustrates another example of text cards. In particular, FIG. 15B illustrates a second reply 1560 to the first text card 1530. In this example, the second reply 1560 can be posted by a fourth user (e.g., Rebecca). The fourth user can be the same as or different from the first user, the second user, and the third user. The second reply 1560 can include content (e.g., a message that states "I do"). Because the second reply 1560 is now associated with the first text card 1530, the first submission box 1545 can no longer be associated with the first text card 1530. Instead, a third submission box 1565 can be associated with the second reply 1560. The third submission box 1560 can allow a user to respond to the content of the first text card 1530 or the second reply 1560. In some examples, the first submission box 1545 can still be associated with the first text card 1540, allowing a user to choose to respond to either the first text card 1540 or the second reply 1560.

When a new text card is posted to screen 1520, the new text card can include a visual indication that the new text card is a most recent text card. For example, the new text card can be put on a bottom of a list of text cards. When a new reply is posted to a screen 1520, the text card that is either directly or indirectly associated with the reply can be moved to a position indicating the text card is the a most recent text card. For example, the text card can be inserted at a bottom of a list of text cards. For example, when the second reply 1560 was posted in FIG. 15B, the first text card 1530 can be inserted at a bottom of a list of text cards. In such an example, the reply 1560 can cause the first text card 1530 to switch places with the second text card 1540. By switching places, the second text card 1540 and the first reply 1550 can be moved up one spot in the list of the text cards.

Because in the example above there are only two text cards, the switch causes the second text card 1540 to go to the top of the list of the text cards; however, if there are three or more text cards, moving a text card to the bottom would not cause the lowest text card to move to the top of the list, but rather to one spot higher in the list than it previously was. For example, if there are three text cards (A, B, and C), and a reply is posted to A, the new order of the text cards would be B, C, and A. In other words, when an update to the screen 1520, or a thread of text cards, is posted, the update would show up at the bottom of the thread with the related messages.

Figure 16:
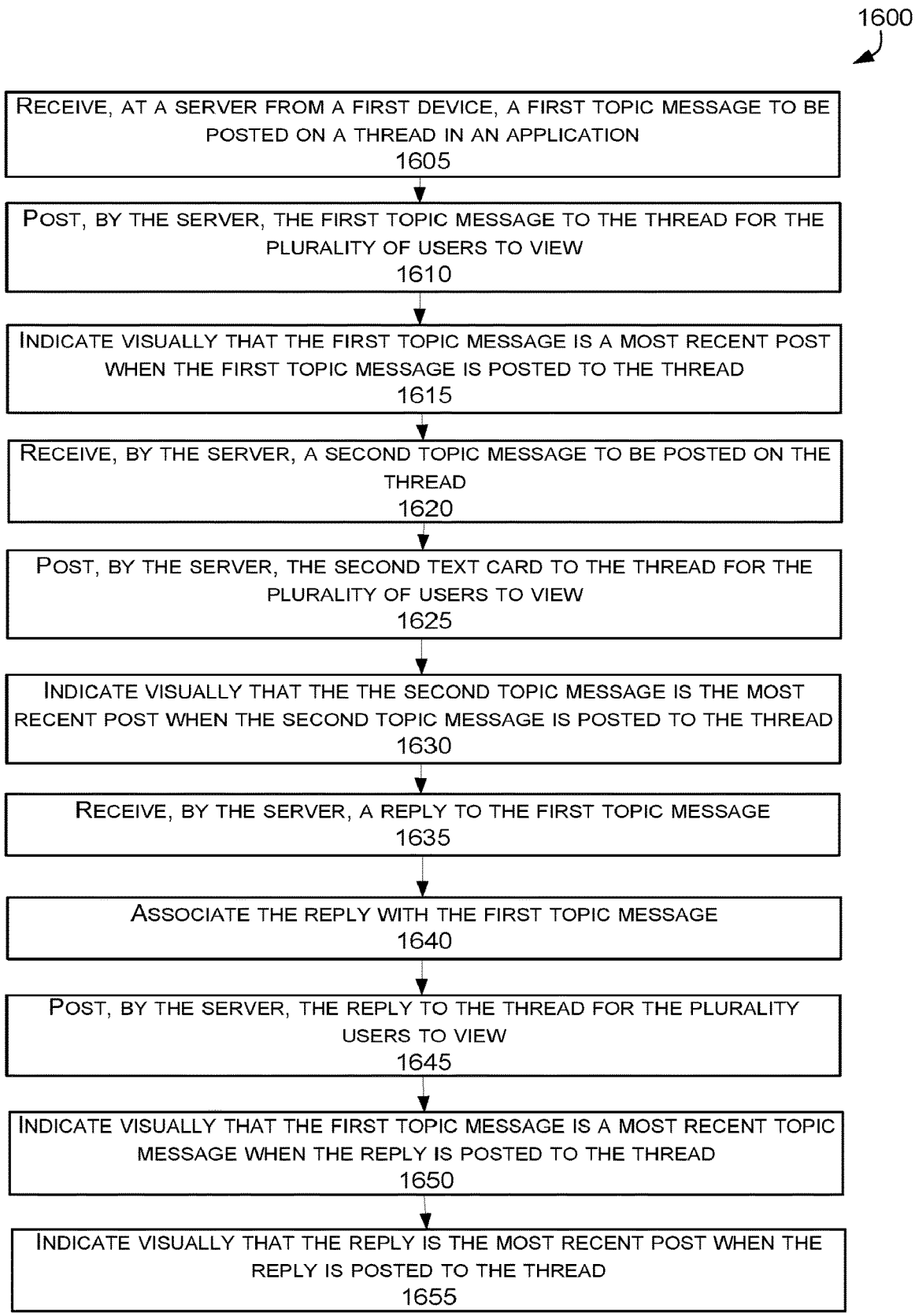
FIG. 16 is a flowchart illustrating an embodiment of a process for organizing a plurality of text cards in a thread.

FIG. 16 is a flowchart illustrating an embodiment of a process 1600 for organizing a plurality of text cards in a thread. In some aspects, the process 1600 can be performed by a mobile device. While specific examples may be given of a mobile device, one of ordinary skill in the art will appreciate that other devices can be included in the process 1600.

Process 1600 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1600 can be performed under the control of one or more computer systems configured with executable instructions and may be implemented as code (e.g., executable instructions, one or more computer programs, or one or more applications) executing collectively on one or more processors, by hardware, or combinations thereof. As noted above, the code can be stored on a machine-readable storage medium, for example, in the form of a computer program comprising a plurality of instructions executable by one or more processors. The machine-readable storage medium can be non-transitory.

At step 1605, the process 1600 includes receiving a first topic message to be posted on a thread in an application. The first topic message can be received at a server from a first device. The thread can be associated with an interaction between a plurality of users. The application can be executing on a mobile device for each of the plurality of users.

At step 1610, the process 1600 further includes posting the first topic message to the thread for the plurality of users to view. The topic message can be posted by the server. At step 1615, the process 1600 further includes indicating visually that the first topic message is a most recent post when the first topic message is posted to the thread. A visual indication can include highlighting the first topic message in a different color or moving the first topic message to a first position in a list.

At step 1620, the process 1600 further includes receiving a second topic message to be posted on the thread. The second topic message ca be received by the server.

At step 1625, the process 1600 further includes posting the second topic message to the thread for the plurality of users to view.

At step 1630, the process 1600 further includes indicating visually that the second topic message is the most recent post when the second topic message is posted to the thread. For example, the first topic message can be unhighlighted when the second topic message is highlighted. For another example, the second topic message can be posted below the first topic message.

At step 1635, the process 1600 further includes receiving a reply to the first topic message. The reply can be received by the server. At step 1640, the process 1600 further includes associating the reply with the first topic message. Associating the reply with the first topic message can mean grouping the two messages together in the thread such that the two messages are physically near each other.

At step 1645, the process 1600 further includes posting the reply to the threat for the plurality users to view. The reply can be posted by the server At step 1650, the process 1600 further includes indicating visually that the first topic message is a most recent topic message when the reply is posted to the thread.

At step 1655, the process 1600 further includes indicating visually that the reply is the most recent post when the reply is posted to the thread. For example, the second topic message can be unhighlighted when the reply is highlighted. The visual indications mentioned above can be different for each step.

VIII. Management of Content

Conventionally, content posted by a user to groups of users require a substantial amount of manual interaction by the user. For example, a user must determine a title for the content. In addition, once content is posted, the user is typically unaware how other users use the content. For example, if content is shared to other people, the original poster might not ever know. Even when the user wants to remove the content because of a request by another user, the user must manually find the content and navigate a deletion procedure.

Embodiments herein allow users to let an application determine a title for content. For example, the application can extract words from content to identify a quick title that can be used for identification purposes. Embodiments herein also allow users to know who is sharing content that they posted as well as provide an easier way for requesting content to be deleted.

A. Delete Request

Figure 17B:
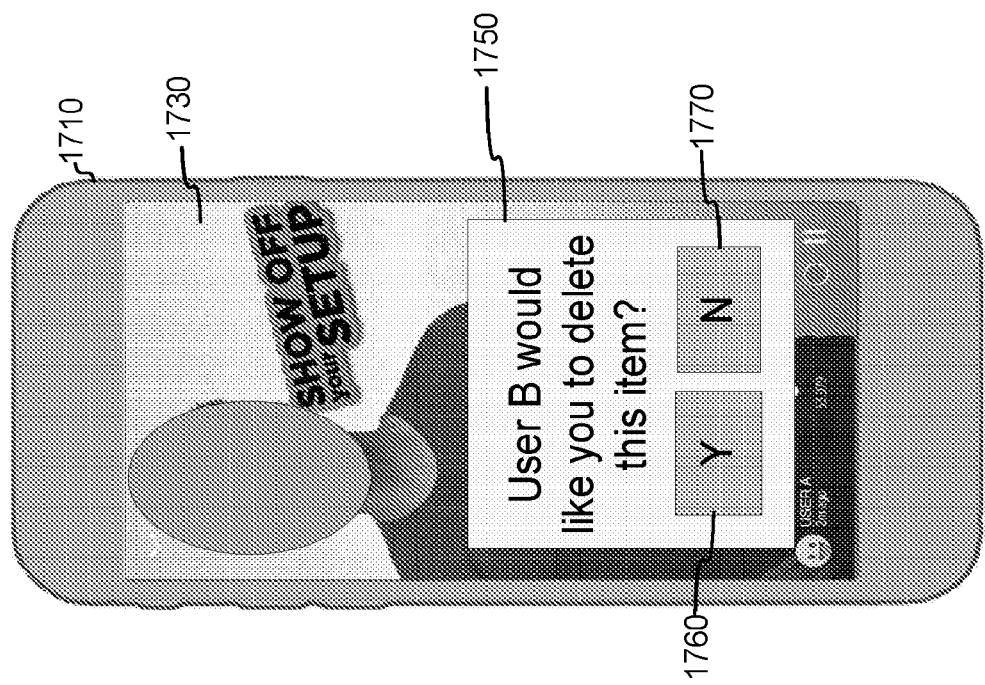
FIGS. 17A-17B illustrate an example of a request to a user to delete content posted by a user.
Figure 17A:
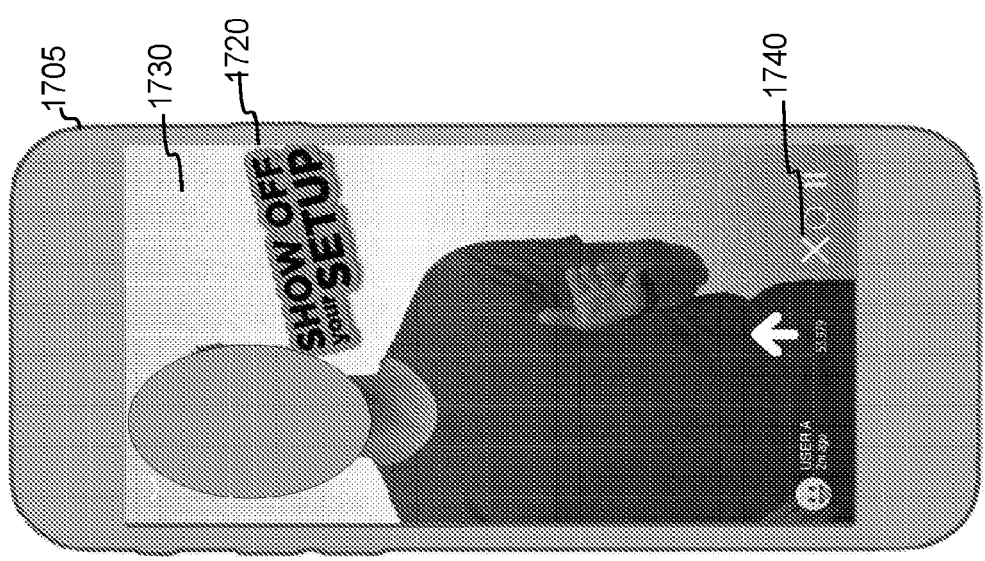

FIG. 17A illustrates an example of content 1730 being displayed on a mobile device 705 with a delete request button 1740. The content 1730 can be a picture, video, or any other type of media that can be displayed on a screen 1720 of the mobile device 705. The content can be displayed using an application on the mobile device 705. The application can allow a plurality of users to view the content 1730 using the application. The mobile device 705 can be associated with a first user. The content 1730 can be posted to the application by a second user. In some examples, the second user can be associated with a mobile device 1710, which is different from the mobile device 1705. The second user can be different from the first user. While the delete request button 1740 appears to be an "X," the delete request button 1740 can be in any form that would allow a user to indicate their desire for the content 1730 to be deleted. The delete request button 1740 can be associated with an identifier of the content 1730, which can be a unique number assigned to the content. By being associated with an identifier of the content 1730, the delete request button 1740 can include in the request a way to identify which content to delete.

The delete request button 1740 can cause a system associated with the application to send a request to the mobile device 1710. FIG. 17B illustrates an example of the request to delete the content 1730. The request can include the content 1730 and/or a notification 1750. The notification 1750 can include at least one or more of an identification of the content 1730, a message for the second user to delete the content 1730, one or more buttons (e.g., a yes button 1760 and a no button 1770) for the second user to indicate whether to delete the content 1730, or any combination thereof. In some embodiments, another type of indicator can be used to indicate whether to delete the content 1730 (e.g., a radio button, text, a swipe, or other indicator).

If the second user indicates to delete the content 1730 (e.g., by pushing the yes button 1760), the application can automatically remove the content 1730 from the application. In some instances, the yes button 1760 can be bound to the content 1730, such that the yes button 1760 can delete the content 1730. Once the content 1730 is deleted, the first user, or any other user on the application, might no longer be able see the content 1730 on the application. In other instances, by removing the content 1730 from the application, the content 1730 might no longer be loaded for the application. In such instances, a mobile device that already is viewing the content 1730 can continue to view the content 1730.

In some instances, the second user can access a secondary menu on the content 1730. The secondary menu can provide a feature called "request delete." Upon clicking "request delete," the second user can include a message (e.g., "Hey, I do not like the shirt that I am wearing in the video."). The second user can then send the request with the message to the first user. After the request is sent, the second user can see that they have sent a request. For example, a text for the feature called "request delete" can change to "delete request sent."

The first user can receive a notification that the second user requests the first user delete the content 1730. The content 1730 can be identified by a title, as described below. The notification can include a link to the content 1730 so that the first user can view what content the second user wants the first user to delete. The message provided by the second user can also be included in the notification.

The notification can include a delete and/or keep button, which can both be included in the link provided in the notification. Clicking delete can delete the content from the application and send a second notification back to the second user informing the second user that the content has been deleted. Clicking keep can send a third notification to the second user. The third notification can inform the second user that the first user decided not to delete the content. The third notification can be sent after a particular amount of time has passed since the notification was sent.

Two or more users can request that the first user delete the content 1730. In such instances, the notification sent to the first user can include an aggregated list of the two or more users that requested that the first user delete the content 1730. In addition, the notification associated with the first user keeping or deleting the content 1730 can be sent to the two or more users.

B. Title Determination

Figure 18:
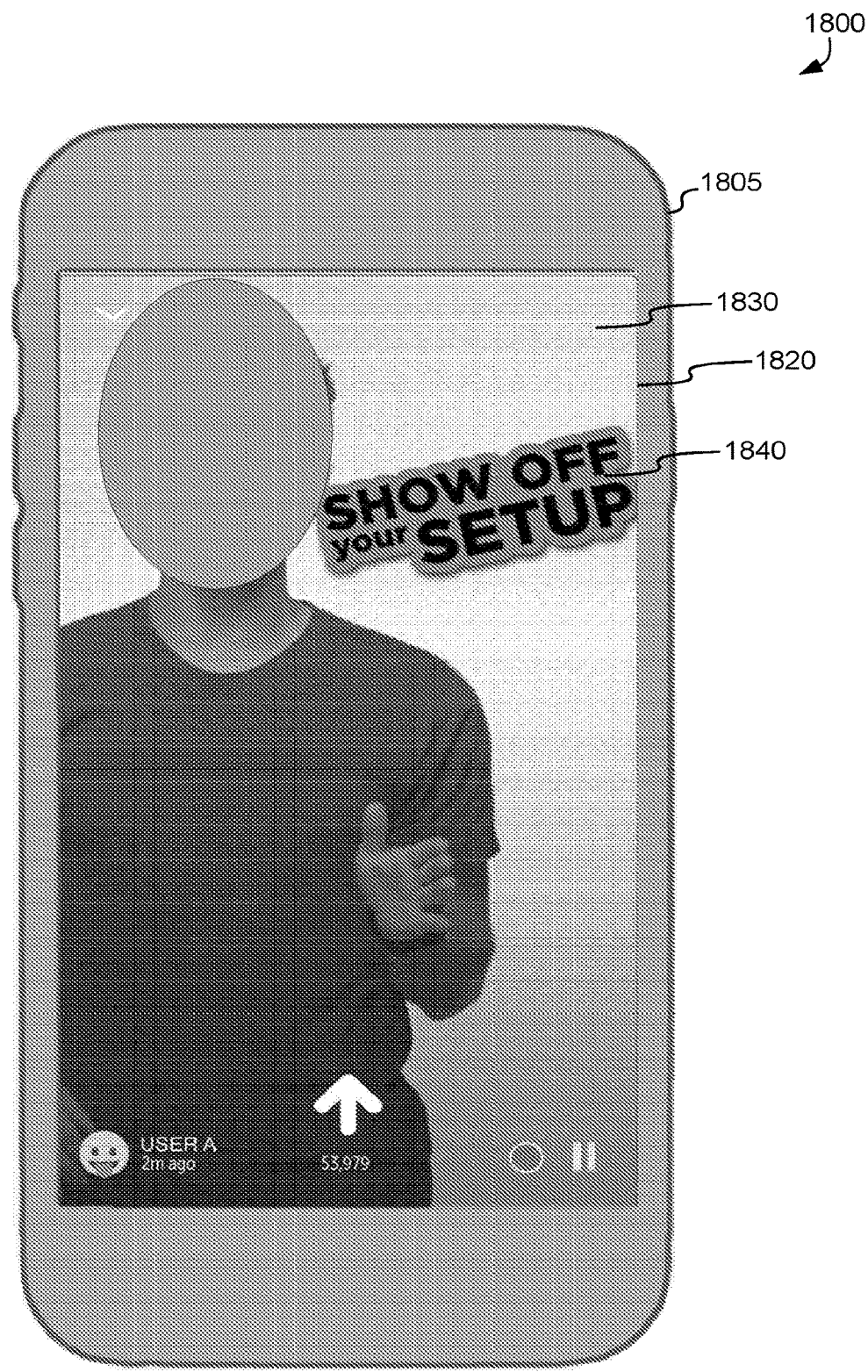
FIG. 18 illustrates an example of a title being determined for content.

FIG. 18 illustrates an example of a title being determined for content 1830. The content 1830 can be displayed in an application on a screen 1820 of a mobile device 1805. The content 1830 can include text 1840, which can be a part of the content 1830 (e.g., words in a sign on a picture). In other instances, the text 1840 can be overlaid on the content 1830 by a user who posted the content 1840 in the application. The text 1840 can be inputted using a keyboard. In such instances, the content 1830 might not include any kind of identification associated with the content 1830. In such instances, a title can be determined for the content 1830 using the text 1840. The title can be formed by concatenating up to a number of characters, or words.

In some instances, text overlaid on the content 1830 can be extrapolated starting from the top left of the content and progressing left to right and top to bottom. For example, a user can input text that includes "SHOW OFF your SETUP" in the content 1830. In such an example, the input text can be identified as a title of the content 1830. By assigning the input text as the title, a user receiving the content can receive a notification that states: "A user just posted a video, SHOW OFF your SETUP." For another example, a user can insert "hot" in the top left corner of a content and "day" in the bottom right corner of the content. The title of the content might be "hot day." The title can also be used to identify the content 1830 for other operations described herein, such as requesting to delete content.

C. Share Notification

Figure 19:
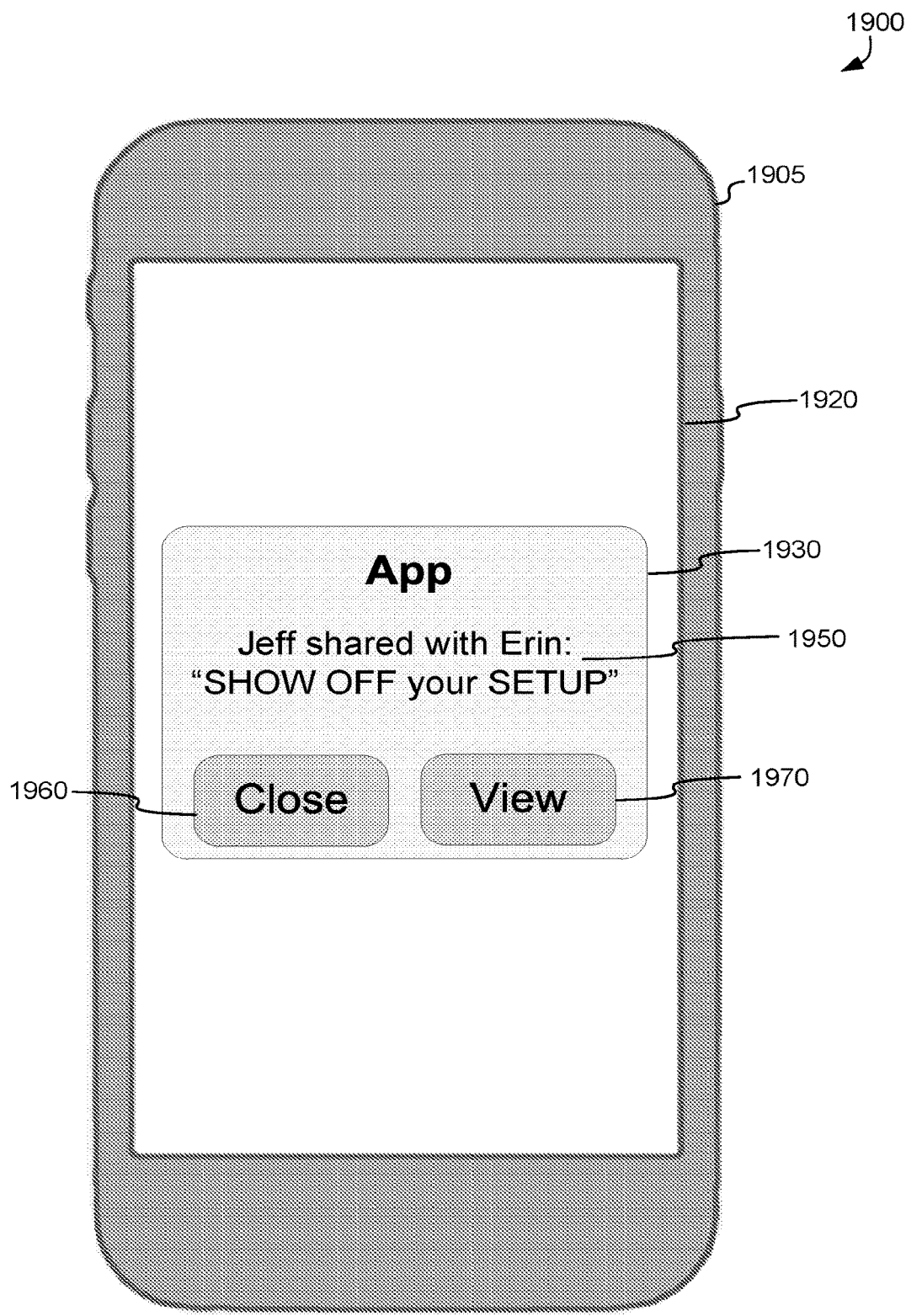
FIG. 19 illustrates an example of a share notification on a mobile device.

FIG. 19 illustrates an example of a share notification 1930 on a mobile device 1905. When a first user shares a post of a second user to a third user or a group of users, the second user can be notified with the share notification 1930 that the first user shared the post. When the third user, or a member of the group of users, further shares the post, the second user can again be notified by a notification similar to the share notification 1930. In some instances, the first user can also be notified when the third user, or a member of the group of users, shares the post. The share notification 1930 can be received by the mobile device 1905. The share notification 1930 can be displayed on a screen 1920 of the mobile device 1905.

The share notification 1930 can include a name of the application that was used to share the post. The share notification 1930 can further include a message 1950. The message 1950 can include an identification of a user that shared the post and a user that received the shared post (e.g., "Jeff shares with Erin"). The message 1950 can further include one or more buttons. The one or more buttons can include a "Close" button 1960 that dismisses the share notification 1930. The one or more buttons can include a "View" button 1970 that allows a user to view what was shared. In other instances, the "View" button 1970 can allow a user to view at least one or more of a user that shared the post and a user that received the shared post.

The share notification 1930 can also include an identification of the post (e.g., "SHOW OFF your SETUP"). The identification of the post can be generated based on a title determination as discussed herein.

IX. Audio Magic Words

A system can detect whether a particular one or more words are present in a video. If the one or more words are detected, visual and/or audio effects can be applied to content (e.g., picture, video, message, etc.) based on the one or more words. For example, the words "Happy Birthday" in an audio portion of a video can trigger an effect to the audio portion or a visual portion of the video. A visual effect can include adding additional content to be displayed on top of the content. An audio effect can include changing or adding sound to content to change what a user hears when viewing the content.

In some instances, after searching the audio portion for a phrase of one or more words, a server, or application, can access a table to determine one or more effects that can be applied to the video. The table can be associated with the phrase identified in the audio portion. The one or more effects can correspond to the phrase identified in the audio portion.

In some instances, the system can detect a sentiment that is associated with one or more words. The sentiment can be determined from one or more words that were extracted from an audio portion in a number of ways known by a person of ordinary skill in the art. See e.g., Kaushik, L., Sangwan, A., & Hansen, J. H. (2013). Sentiment extraction from natural audio streams. 2013 *IEEE International Conference on Acoustics, Speech and Signal Processing*. doi: 10.1109/icassp.2013.6639321. For example, rather than just looking for the word "Disneyland," the system can identify that the user did not have a good time at Disneyland. The system might determine that a user says "Disneyland was horrible." In such an example, an effect might not be applied to the video.

The one or more effects from the table can be provided to a user of a mobile device. The user can select a first effect of the one or more effects to be applied to the video. By selecting the first effect, a notification can be sent to the server, or the application, that includes an identification of the effect selected. The server, or the application, can then apply the effect to at least one or more of the visual portion and the audio portion of the video.

In some instances, a user can flip through one or more possible effects associated with the phrase. For example, if a system detects "Happy Birthday," the user might be able to flip through fireworks, a cake, balloons, a high pitched voice, and other effects that deal with a birthday. In some instances, a left arrow and a right arrow (or a left swipe left and/or a right swipe on a screen of a mobile device) can be used to flip through different possibilities. In other instances, a menu can be generated for a user to pick an effect from a list of one or more effects.

A. Visual Effects

Figure 20:
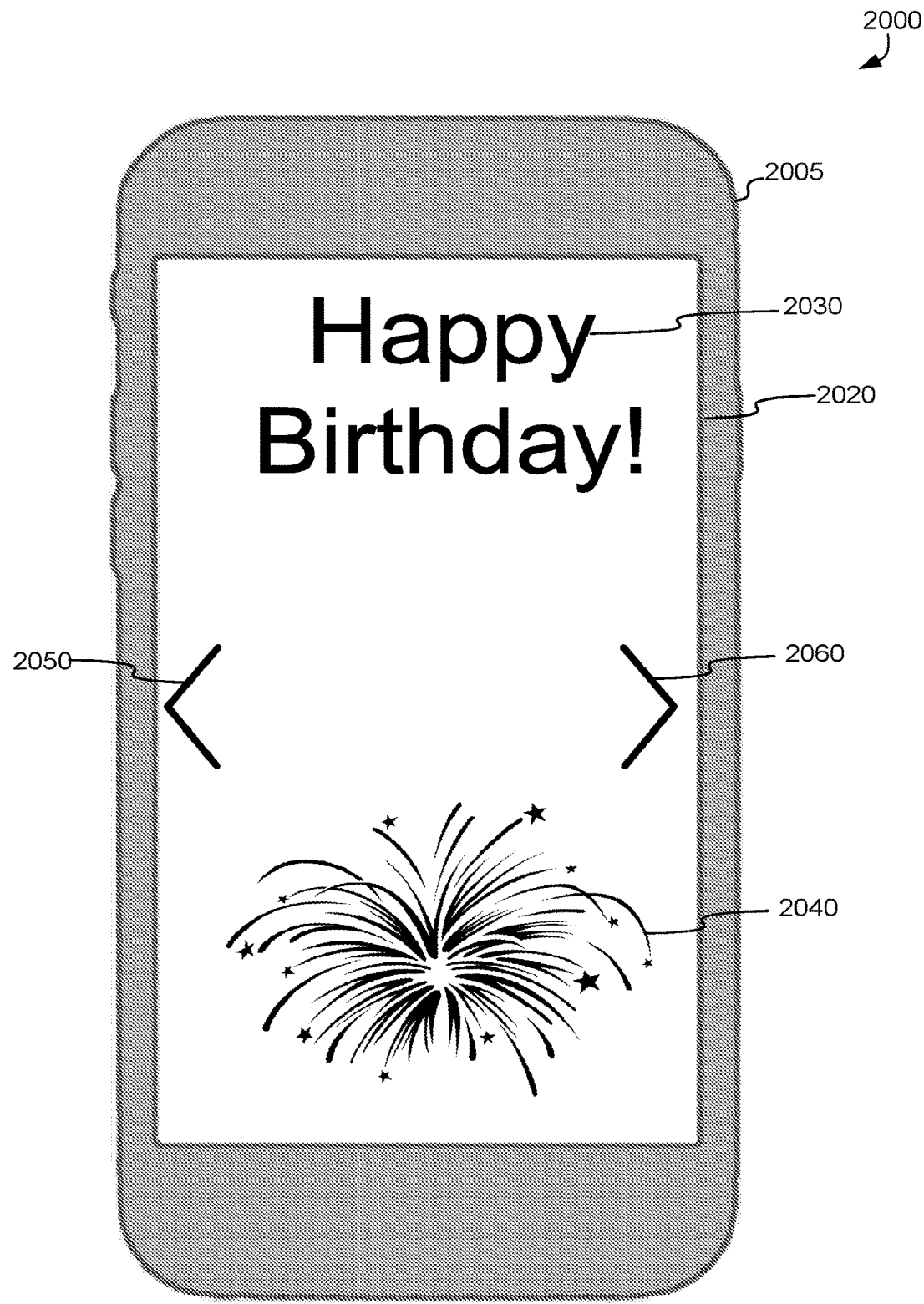
FIG. 20 illustrates an example of an option to apply an audio effect to an audio portion of a video.

FIG. 20 illustrates an example a visual effect for a video based on detection of one or more words. After detecting "Happy Birthday" in an audio portion, the phrase "Happy Birthday!" 2030 can be inserted into a video with a picture of fireworks 2040. A person of ordinary skill in the art will recognize that other visual effects can be used when a particular phrase is recognized. As discussed herein, a left arrow 2050 and a right arrow 2060 can be used to switch between visual effects. For another example, the system can detect the word "Disneyland." In such an example, a visual effect, such as a castle, can be added to the video.

Figure 21:
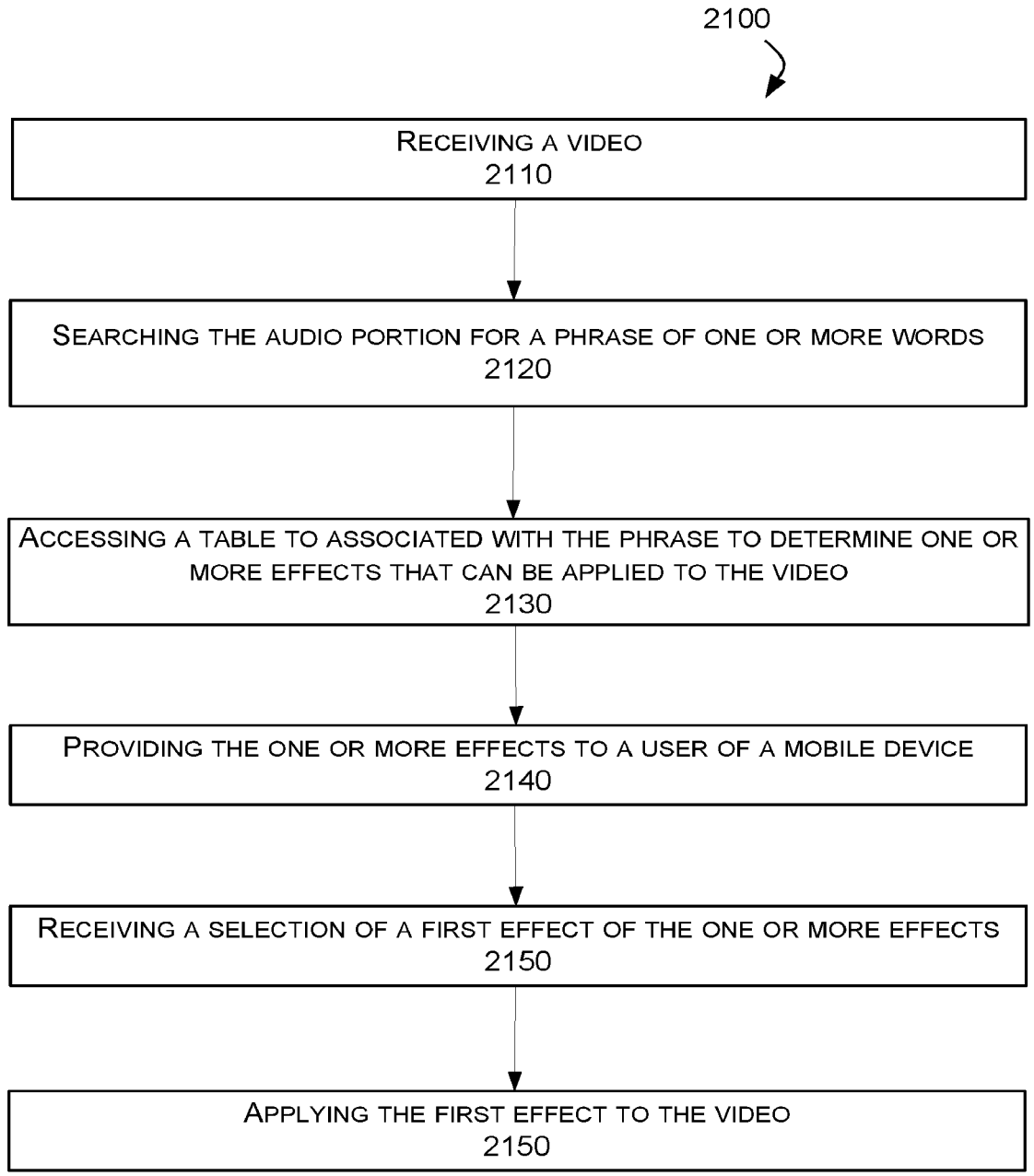
FIG. 21 illustrates an example of a visual effect to a video based on detection of one or more words.

FIG. 21 is a flowchart illustrating an embodiment of a process for applying a visual effect to a video based on detection of one or more words. In some aspects, the process 2100 can be performed by a mobile device. While specific examples may be given of a mobile device, one of ordinary skill in the art will appreciate that other devices can be included in the process 2100.

Process 2100 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 2100 can be performed under the control of one or more computer systems configured with executable instructions and may be implemented as code (e.g., executable instructions, one or more computer programs, or one or more applications) executing collectively on one or more processors, by hardware, or combinations thereof. As noted above, the code can be stored on a machine-readable storage medium, for example, in the form of a computer program comprising a plurality of instructions executable by one or more processors. The machine-readable storage medium can be non-transitory.

At step 2110, the process 2100 includes receiving a video. In some examples, the video can be received by a server that is hosting an application. In other examples, the video can be received by an application that is installed on a mobile device. In some examples, the video can be recorded on a mobile phone. The video can includes at least one or more of a visual portion and an audio portion.

At step 2120, the process 2100 further includes searching the audio portion for a phrase of one or more words. The searching can be performed by an audio recognition software that can transcribe at least a portion of the audio portion. The transcription can then be searched for the phrase. Other methods of searching the audio portion for the phrase can be performed. For example, one words can be transcribed at a time. When a word matches at least a portion of the phrase, the surrounding words can be combined with the word to see if the phrase is present in the audio portion.

At step 2130, the process 2100 further includes accessing a table associated with the phrase to determine one or more effects that can be applied to the video. The table can be stored on the server. In other embodiments, the table can be stored remotely from the server. In such embodiments, the table can be accessible from the server. The one or more effects can correspond to the phrase identified in the audio portion.

At step 2140, the process 2100 further includes providing the one or more effects to a user of a mobile device. The one or more effects can be provided by a list of possible effects. In other examples, an effect of the one or more effects can be performed on the video to show a user what would be the result. In such embodiments, a user can cycle through the one or more effects to see what other effects can be used on the video. The mobile device can be the same or different than the mobile device that recorded the video.

At step 2150, the process 2100 further includes receiving a selection of a first effect of the one or more effects. The first effect can change at least one or more of the visual portion and the audio portion of the video. If the first effect is associated with the audio portion, applying the first effect to the audio portion can change how the audio portion sounds. If the first effect is associated with visual portion, applying the first effect to the visual portion can change how the video looks.

At step 2160, the process 2100 further includes applying the first effect to the video. Applying the first effect to the video can include matching the audio portion after the first effect is applied to the audio portion before the first effect is applied. Matching can include ensuring that the audio portion is the same length of time before and after the first effect is applied.

B. Audio Effects

Figure 22:
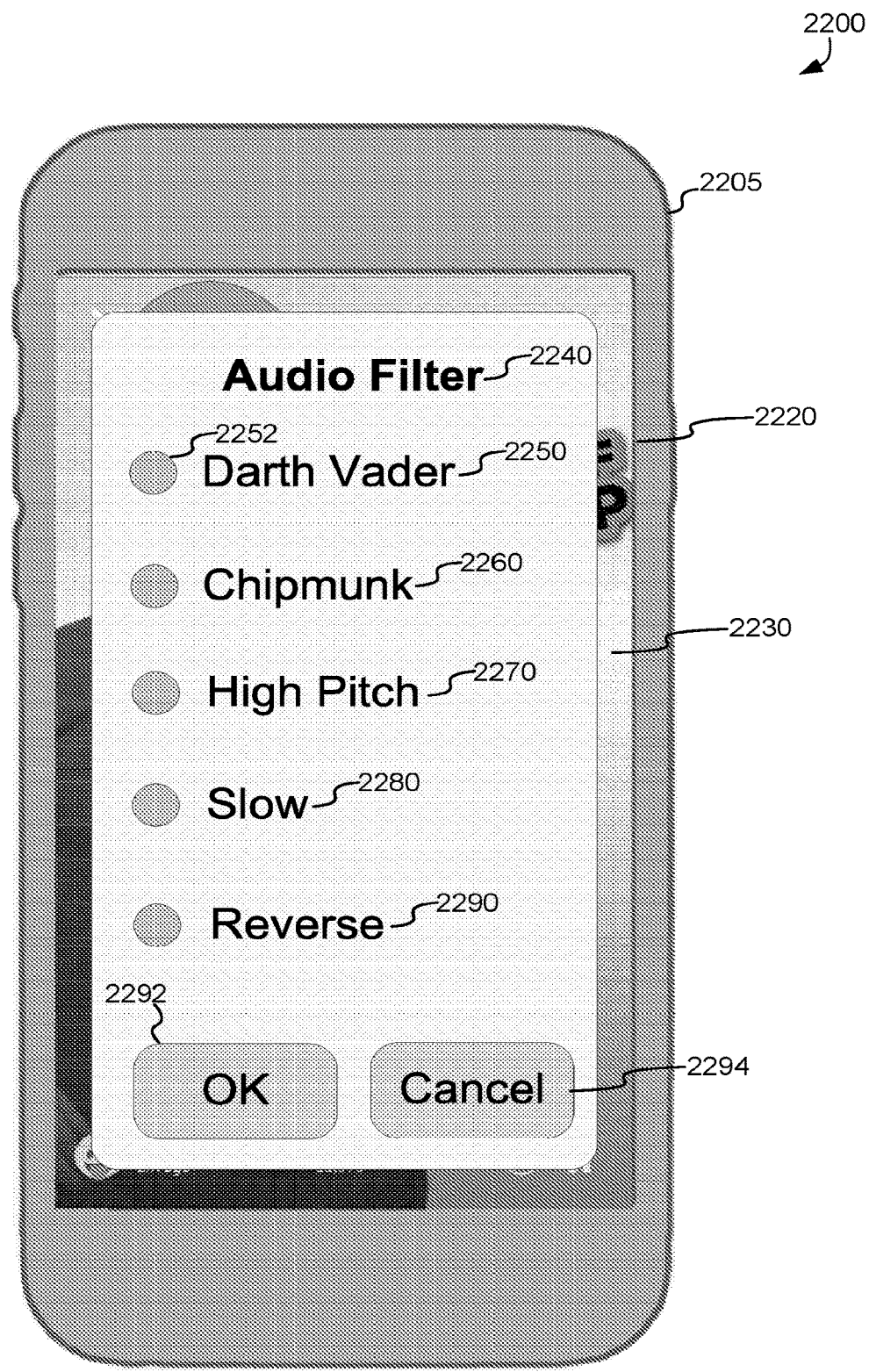
FIG. 22 is a flowchart illustrating an embodiment of a process for applying a visual filter for a video based on detection of one or more words.

FIG. 22 illustrates an example of an option to apply an audio effect to an audio portion of a video. An audio effect can be applied after a video is recorded on a mobile device 2005. The whole video, or merely the audio portion, can be sent to a server to have an audio effect applied.

A user can swipe a screen 2220 of the mobile device 2205 to have a different audio effect applied to the audio, or the audio portion (e.g., Darth Vader, chipmunk, high pitch, slow, reverse, or any other altered sound). In other instances, the user can pick a type of audio effect using a radio button (e.g., radio button 2052). The radio button can be associated with a form (e.g., Darth Vader 2050, Chipmunk 2060, High Pitch 2070, Slow 2080, and Reverse 2090). Other examples of audio effects can include sounding like an old person and a young person.

The audio effects available can be based on one or more words identified in an audio, or audio portion. For example, the system can detect the words "I am your father." In such an example, the system can apply an audio effect in order to make the voice sound like Darth Vader.

The audio can change based on changing one or more audio waves associated with the audio. When changing the one or more audio waves for a video, timing of the audio can be augmented to maintain synchronous with a video portion of the video. Maintaining synchronous can include ensuring that the audio last a particular amount of time. For example, sounding like a chipmunk can be achieved by speeding up the audio. However, if the audio is merely sped up, the audio will not match the visual of the mouth. Therefore, the audio waves can be manipulated in a way that does not change the length of time of the audio.

The server can identify one or more people speaking in audio so that the server can augment only individual people. For example, the server can change one voice to sound like Darth Vader while changing another voice to sound like a chipmunk. In other instances, the server can distinguish between a voice of a person and other voice (e.g., ambient noise, machine noise, non-human noise, etc.).

X. Scroll Recognition

Figure 23:
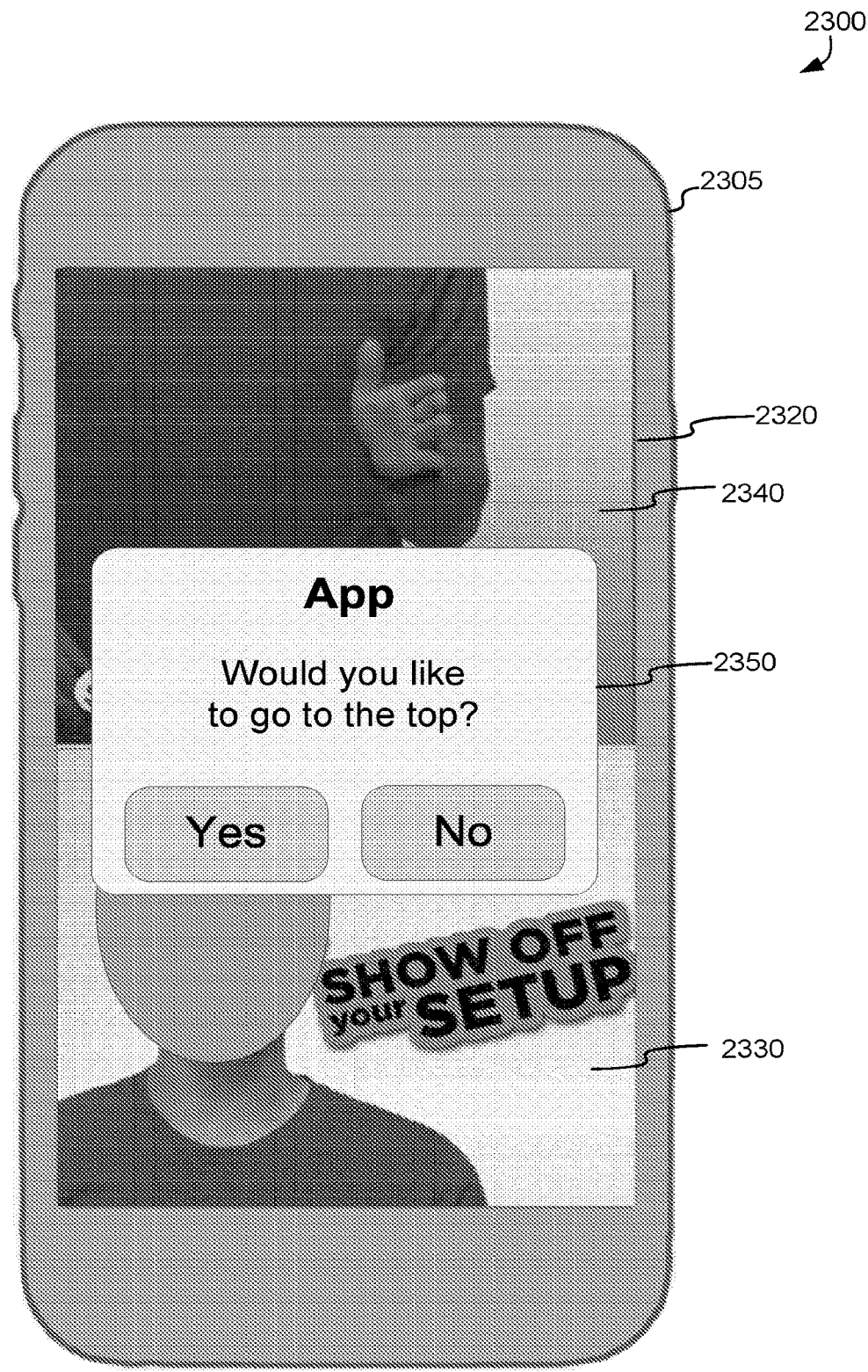
FIG. 23 illustrates an example of a scroll recognition.

FIG. 23 illustrates an example of scroll recognition. The scroll recognition can occur on a screen 2320 of a mobile device 2305. In particular, while a user is scrolling through a list of content, a system can recognize that the user wishes to go to the top of the list. In such instances, the system can analyze the inputs of the user. For example, if a user begins to swipe quickly in an upward direction, the system can determine that the user wants to go to the top of the list. The system can overlay a message 2350 asking the user whether they want to go to a certain point in the list. For example, the system can ask if the user wants to go back a week, a month, or to the beginning. In other examples, the message 2350 can ask whether the user would like to go to the top. Based on a response to the message 2350 of the user, the system can display a desired point in the list.

The scroll recognition can be based on a total length of the list. For example, if there are nine items in a list, the scroll recognition might not activate. However, when there are thousands of items in a list, the system can implement the scroll recognition. The scroll recognition can be based on a change of behavior of a user. The change of behavior can include a velocity of a swipe, an amount of time a user has been swiping, whether or not the user intercepted a swipe, other characteristics that can indicate that the user desires to skip two or more items in a list, or any combination therein. The scroll recognition can use multiple characteristics described herein. For example, the scroll recognition can be based on a total length of the list, a velocity of a swipe, and an amount of time a user has been swiping.

The scroll recognition can be based on a velocity of a swipe. In such instances, the velocity of a swipe can be compared to one or more velocities of one or more previous swipe to determine whether the velocity of the swipe is quick in comparison. A high velocity can be determined based on at least one or more of device type, rendering speed, and finger speed.

The scroll recognition can be based on an amount of time a user has been swiping in a consistent direction. For example, if an user has swiped up 10 times, or for a period of time, the scroll recognition can activate. The scroll recognition can also be based on an amount of time a single swipe takes to complete. The amount of time the single swipe takes to complete can be calculated by determining a first time when a finger is touching a screen and a second time when a finger is no longer touching the screen. The amount of time can equal the difference between the first time and the second time.

The scroll recognition can be based on whether a user has intercepted a scroll. For example, if a user is allowing the system to scroll the full length of a swipe, the system can determine that the user desires to skip one or more items in a list.

When the scroll recognition is activated, a current scroll can slow down, or stop, and allow the user to pick from a list of one or more choices. The list of one or more choices can include a number of items to skip. For example, the choices can include jump 100 items, jump 100 items, go back to the start of the list, jump a day, or any other number that can be transformed into a number of items to skip.

XI. Group-Based Submission

Figure 24:
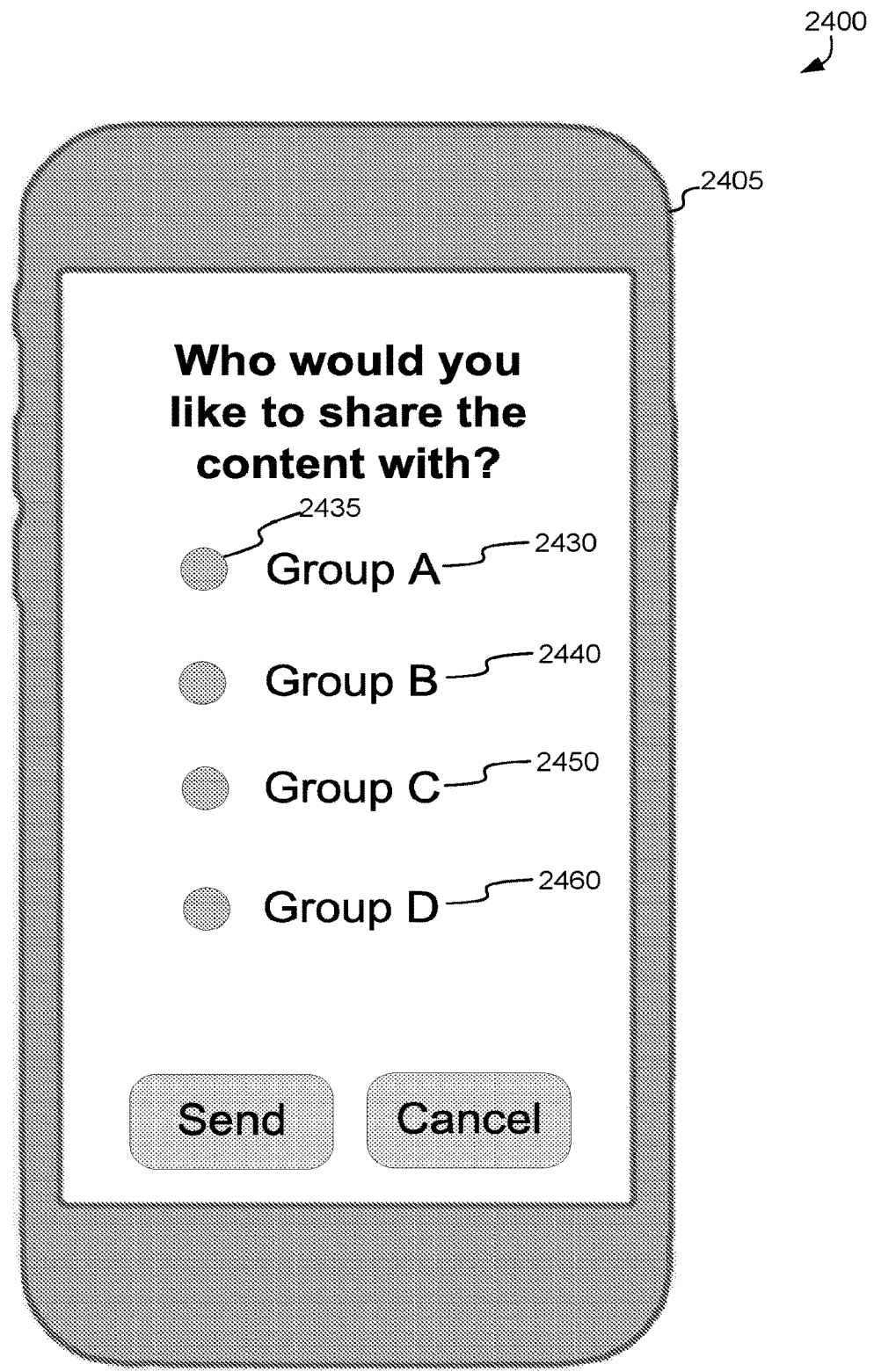
FIG. 24 illustrates an example of a group-based submission.

FIG. 24 illustrates an example of a group-based submission. In such an example, instead of selecting one or more individual people to send content, one or more groups can be selected. A group can include one or more users, or user accounts. For example, a user associated with a mobile device 2405 can have four conversations in an application. Each of the four conversation can include one or more users. In such an example, when the user posts content to the application, the user can select from a list of groups (e.g., Group A 2430, Group B 2440, Group C 2450, and Group D 2460). In some embodiments, each group can be associated with a radio button (e.g., radio button 2435) or any other method of indicating a selection.

A user can receive an option to send to other groups even when the user is in a conversation. In such instances, the user can attempt to post content to one or more groups or conversations. And, rather than merely posting to the group or conversation that the user is currently in, the user can receive an option to post to one or more groups. The one or more groups can include, or exclude, the group or conversation that the user is currently in. In some instances, the post can automatically be posted in the current group or conversation.

In some embodiments, instead of merely posting a copy of original content to one or more locations, group-based submission can allow a user to post the original content to each of the groups. In such embodiments, the original content would not be posted to a particular location, that is later shared to other groups.

When content is received by a user, the user cannot tell whether the content was sent to other users. In such instances, the content can be sent to each user individually even though the user that posted the content posted to the group as a whole. In some instances, a user in a first group cannot cannot tell whether the content was sent to a second groups. In other instances, the users in a group can see that the other users in the group received the content.

XII. Example Subsystems and Components

Figure 25:
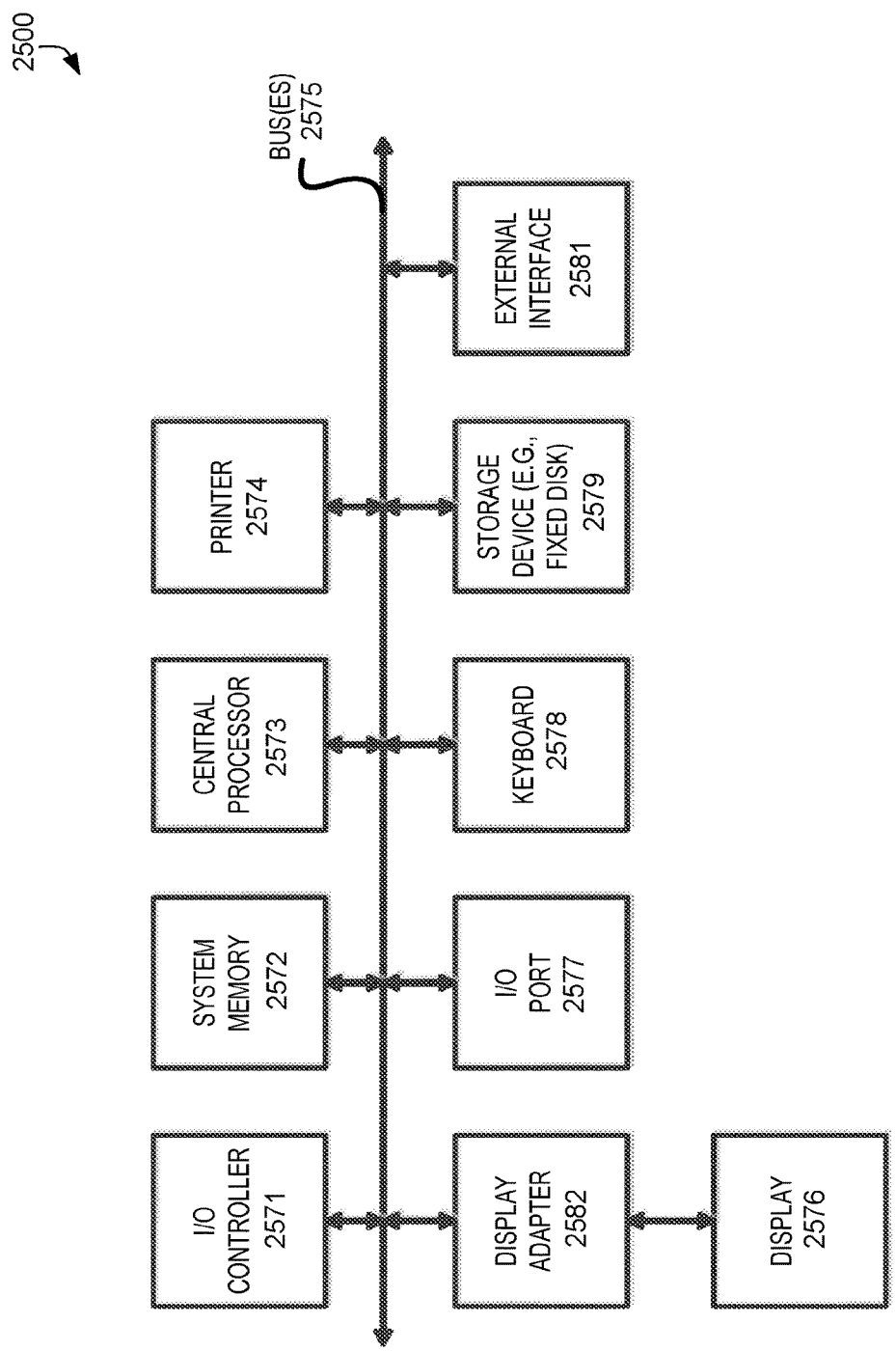
FIG. 25 illustrates a block diagram of an exemplary computer apparatus that can be used in embodiments herein.

FIG. 25 illustrates a block diagram of an exemplary computer apparatus that can be used in embodiments herein. A client or a server can use a suitable number of subsystems. Examples of subsystems or components are shown in FIG. 25. The subsystems shown in FIG. 25 can be interconnected via a system bus 2575. Additional subsystems are shown in FIG. 25, including a printer 2574, keyboard 2578, storage device 2579 (e.g., or "fixed disk" such as an optical disk, magnetic disk or "hard drive," flash storage, etc.), display 2576 (which is coupled to display adapter 2582), and others. Peripherals and input/output (I/O) devices, which couple to I/O controller 2571, can be connected to the computer system by any number of means known in the art, such as input/output (I/O) port 2577 (e.g., USB, FireWire®). For example, I/O port 2577 or external interface 2581 (e.g. Ethernet, Wi-Fi, etc.) can be used to connect the computer apparatus to a wide area network such as the Internet, a mouse input device, or a scanner. The interconnection via system bus can allow the central processor 2573, which can include one or more processors, to communicate with each subsystem and to control the execution of instructions from system memory 2572 or the storage device 2579, as well as the exchange of information between subsystems. The system memory 2572 and/or the storage device 2579 can embody a computer readable medium. Any of the data mentioned herein can be output from one component to another component and can be output to the user.

It should be understood that any of the embodiments of the present disclosure can be implemented in the form of control logic using hardware (e.g. an application specific integrated circuit or field programmable gate array) and/or using computer software with a generally programmable processor in a modular or integrated manner. As used herein, a processor can include a multi-core processor on a same integrated chip, or multiple processing units on a single circuit board or networked. Based on the disclosure and teachings provided herein, a person of ordinary skill in the art will know and appreciate other ways and/or methods to implement embodiments of the present disclosure using hardware and a combination of hardware and software.

Any of the software components or functions described in this application can be implemented as software code to be executed by a processor using any suitable computer language such as, for example, Java®, C++, C, Python, or Perl using, for example, conventional programming techniques, functional programming techniques, or object-oriented techniques. The software code can be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium can be any combination of such storage or transmission devices.

Such programs can also be encoded and transmitted using carrier signals adapted for transmission via wired, optical, and/or wireless networks conforming to a variety of protocols, including the Internet. As such, a computer readable medium according to an embodiment of the present disclosure can be created using a data signal encoded with such programs. Computer readable media encoded with the program code can be packaged with a compatible device or provided separately from other devices (e.g., via Internet download). Any such computer readable medium can reside on or within a single computer program product (e.g. a hard drive, a CD, or an entire computer system), and can be present on or within different computer program products within a system or network. A computer system can include a monitor, printer, or other suitable display for providing any of the results mentioned herein to a user.

Any of the methods described herein can be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or in a different order. Additionally, portions of these steps can be used with portions of other steps from other methods. Also, all or portions of a step can be optional. Additionally, any of the steps of any of the methods can be performed with modules, circuits, or other means for performing these steps.

The specific details of particular embodiments can be combined in any suitable manner without departing from the spirit and scope of embodiments of the disclosure. However, other embodiments of the disclosure can be directed to specific embodiments relating to each individual aspect, or specific combinations of these individual aspects.

The above description of exemplary embodiments of the disclosure has been presented for the purposes of illustration and description. It is not intended to be exhaustive or to limit the disclosure to the precise form described, and many modifications and variations are possible in light of the teaching above. The embodiments were chosen and described in order to best explain the principles of the disclosure and its practical applications to thereby enable others skilled in the art to best utilize the disclosure in various embodiments and with various modifications as are suited to the particular use contemplated.

A recitation of "a", "an" or "the" is intended to mean "one or more" unless specifically indicated to the contrary.

What is claimed is:

1. A method comprising:
 transmitting, from a first computing device, a video clip object comprising a first video clip to a first plurality of computing devices;

receiving, at the first computing device, a response video clip from each of the first plurality of computing devices, resulting in a plurality of response video clips;

selecting a set of response video clips from the plurality of response video clips, wherein the set of response video clips comprises fewer video clips than the plurality of response video clips as a result of retaining at least a second video clip and a third video clip, and removing at least a fourth video clip in the plurality of response video clips from the set of response video clips;

altering, by the first computing device for a particular user, the video clip object to include the first video clip and the set of response video clips with the third video clip reordered before the second video clip based on tracked preferences of the particular user indicating a greater preference of the particular user for the third video clip than the second video clip, and wherein said altering comprises rendering a first consolidated video clip object as a single video file that includes the first video clip in a first position of a sequence, the third video clip in a second position of the sequence, and the second video clip in a third position of the sequence;

detect one or more vertical user scroll actions;

controlling playback of the first consolidated video clip object on a display device in response to the one or more vertical user scroll actions, wherein controlling the playback comprises:
  (i) starting playback of the first video clip from the single video file when the first video clip is in a display area of the display device;
  (ii) stopping playback of the first video clip before reaching an end of the first video clip and starting playback of the third video clip from the single video file, that is ordered after the first video clip in the sequence associated with the first consolidated video clip object, in response to a first vertical scroll action that simultaneously scrolls part of the first video clip up and out of a top of the display area and part of the third video clip from below the display area into the display area; and
  (iii) stopping playback of the third video clip before reaching an end of the third video clip and starting playback of the second video clip from the single video file, that is ordered after the third video clip in the sequence associated with the first consolidated video clip object, in response to a second vertical scroll action that simultaneously scrolls part of the third video clip up and out of the top of the display area and part of the second video clip from below the display area into the display area;

detect a sideways user scroll action; and present, in response to the sideways user scroll action, a second consolidated video clip object in the display device, wherein presenting the second consolidated video clip object comprises:
  (i) starting playback of a first video clip from the second consolidated video clip object; and
  (iii) stopping playback of the first video clip from the second consolidated video clip object and starting playback of a second video clip from the second consolidated video clip object, that is ordered after the first video clip in the second consolidated video clip object, in response to a vertical scroll action that is performed after the sideways user scroll action and that simultaneously scrolls part of the first video clip from the second consolidated video clip object up and out of the top of the display area and part of the second video clip from the second consolidated video clip object from below the display area into the display area, and wherein the first video clip and the second video clip of the second consolidated video clip object are different than the first video clip, the second video clip, and the third video clip of the first consolidated video clip object.

2. The method of claim 1 further comprising transmitting the first consolidated video clip object to a second plurality of computing devices from the first computing device.

3. The method of claim 1 further comprising:
reordering the set of response video clips from a time at which each response video clip of the set of response video clips is received to a priority that is assigned to each computing device that provides a response from the set of response video clips; and
producing a sequenced set of video clips from said reordering.

4. The method of claim 3 further comprising altering the video clip object to include the sequenced set of response video clips, wherein said altering yields a third consolidated video clip object.

5. The method of claim 1 further comprising assigning different priorities to each of the first plurality of computing devices based on different characteristics associated with one or more users that use each of the first plurality of computing devices.

6. The method of claim 1 further comprising generating the first consolidated video clip object based on the first video clip comprising metadata linking to the third video clip, and the third video clip comprising metadata linking to the second video clip.

7. The method of claim 1 further comprising receiving metadata indicating an association between the second video clip and the video clip object.

8. The method of claim 7 further comprising joining the second video clip with the first video clip in the video clip object based on said metadata.

9. The method of claim 5, wherein the different characteristics associated with the one or more users comprise one or more of user preferences, user location, and upvotes.

10. A system comprising:
one or more processors configured to:
  transmit a video clip object comprising a first video clip to a first plurality of computing devices;
  receive a response video clip from each of the first plurality of computing devices, resulting in a plurality of response video clips;
  select a set of response video clips from the plurality of response video clips, wherein the set of response video clips comprises fewer video clips than the plurality of response video clips as a result of retaining at least a second video clip and a third video clip, and removing at least a fourth video clip in the plurality of response video clips from the set of response video clips;
  alter the video clip object for a particular user to include the first video clip and the set of response video clips with the third video clip reordered before the second video clip based on tracked preferences of the particular user indicating a greater preference of the particular user for the third video clip than the second video clip, and wherein said altering comprises rendering a first consolidated video clip object as a single video file that includes the first video clip in a first position of a sequence, the third video clip in a second position of the sequence, and the second video clip in a third position of the sequence;
detect one or more vertical user scroll actions;
control playback of the first consolidated video clip object on a display device in response to the one or more vertical user scroll actions, wherein controlling the playback comprises:
  (i) starting playback of the first video clip from the single video file when the first video clip is in a display area of the display device;
  (ii) stopping playback of the first video clip before reaching an end of the first video clip and starting playback of the third video clip from the single video file, that is ordered after the first video clip in the sequence associated with the first consolidated video clip object, in response to a first vertical scroll action that simultaneously scrolls part of the first video clip up and out of a top of the display area and part of the third video clip from below the display area into the display area; and
  (iii) stopping playback of the third video clip before reaching an end of the third video clip and starting playback of the second video clip from the single video file, that is ordered after the third video clip in the sequence associated with the first consolidated video clip object, in response to a second vertical scroll action that simultaneously scrolls part of the third video clip up and out of the top of the display area and part of the second video clip from below the display area into the display area;
detect a sideways user scroll action; and
present, in response to the sideways user scroll action, a second consolidated video clip object in the display device, wherein presenting the second consolidated video clip object comprises:
  (i) starting playback of a first video clip from the second consolidated video clip object; and
  (ii) stopping playback of the first video clip from the second consolidated video clip object and starting playback of a second video clip from the second consolidated video clip object, that is ordered after the first video clip in the second consolidated video clip object, in response to a vertical scroll action that is performed after the sideways user scroll action and that simultaneously scrolls part of the first video clip from the second consolidated video clip object up and out of the top of the display area and part of the second video clip from the second consolidated video clip object from below the display area into the display area, and wherein the first video clip and the second video clip of the second consolidated video clip object are different than the first video clip, the second video clip, and the third video clip of the first consolidated video clip object.

11. The system of claim 10, wherein the one or more processors are further configured to:
  transmit the first consolidated video clip object to a second plurality of computing devices from the first computing device.

12. The system of claim 10, wherein the one or more processors are further configured to:
  reorder the set of response video clips from a time at which each response video clip of the set of response video clips is received to a priority that is assigned to each computing device that provides a response from the set of response video clips; and
  produce a sequenced set of video clips from said reordering.

13. The system of claim 12, wherein the one or more processors are further configured to:
  alter the video clip object to include the sequenced set of response video clips, wherein said altering yields a third consolidated video clip object.

14. The system of claim 10, wherein the one or more processors are further configured to:
  assign different priorities to each of the first plurality of computing devices based on different characteristics associated with one or more users that use each of the first plurality of computing devices.

15. The system of claim 14, wherein the different characteristics associated with the one or more users comprise one or more of user preferences, user location, and upvotes.

16. The system of claim 10, wherein the one or more processors are further configured to:
  generate the first consolidated video clip object based on the first video clip comprising metadata linking to the third video clip, and the third video clip comprising metadata linking to the second video clip.

17. The system of claim 10, wherein the one or more processors are further configured to receive metadata indicating an association between the second video clip and with the video clip object.

18. The system of claim 17, wherein the one or more processors are further configured to:
  join the second video clip with the first video clip in the video clip object based on said metadata.

19. The system of claim 10,
  wherein stopping the playback of the first video clip and starting the playback of the third video clip comprises:
    skipping within the first consolidated video clip object from the first video clip to the third video clip; and
    presenting, during the playback of the third video clip, a response from a first user reacting to the first video clip;
  wherein stopping playback of the third video clip and starting the playback of the second video clip comprises:
    skipping within the first consolidated video clip object from the third video clip to the second video clip; and
    presenting, during the playback of the second video clip, a response from a different second user reacting to the first video clip.

* * * * *